US012572043B2

(12) United States Patent
Ikeda et al.

(10) Patent No.: US 12,572,043 B2
(45) Date of Patent: Mar. 10, 2026

(54) OPTICAL ELEMENT AND LIGHTING DEVICE INCLUDING THE OPTICAL ELEMENT

(71) Applicant: Japan Display Inc., Tokyo (JP)

(72) Inventors: Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/914,897

(22) Filed: Oct. 14, 2024

(65) Prior Publication Data

US 2025/0035991 A1     Jan. 30, 2025

Related U.S. Application Data

(63) Continuation of application No. PCT/JP2023/019059, filed on May 23, 2023.

(30) Foreign Application Priority Data

Jun. 3, 2022     (JP) ................................. 2022-090917

(51) Int. Cl.
*G02F 1/1343*     (2006.01)
*G02F 1/1337*     (2006.01)
*G02F 1/1347*     (2006.01)

(52) U.S. Cl.
CPC .. *G02F 1/134309* (2013.01); *G02F 1/133757* (2021.01); *G02F 1/1347* (2013.01)

(58) Field of Classification Search
CPC ......... G02F 1/134309; G02F 1/133757; G02F 1/1347
See application file for complete search history.

(56) References Cited

U.S. PATENT DOCUMENTS

2008/0143939 A1*  6/2008  Adachi ............. G02F 1/134363
                                                         349/114
2010/0149444 A1    6/2010  Hikmet et al.
                          (Continued)

FOREIGN PATENT DOCUMENTS

JP        2010101946 A  *  5/2010
JP        2010-230887 A     10/2010
                          (Continued)

OTHER PUBLICATIONS

Search Report issued in related International Patent Application No. PCT/JP2023/019059 mailed on Aug. 8, 2023 and English translation of same. 5 pages.

*Primary Examiner* — Lucy P Chien
(74) *Attorney, Agent, or Firm* — K&L Gates LLP

(57)     ABSTRACT

An optical element includes a first liquid crystal cell, a second liquid crystal cell, a third liquid crystal cell, and a fourth liquid crystal cell arranged in this order to overlap one another. Each of the first liquid crystal cell, the second liquid crystal cell, the third liquid crystal cell, and the fourth liquid crystal cell includes a plurality of first electrodes arranged in a stripe form and extending in a first extending direction, a first orientation film over the plurality of first electrodes, a liquid crystal layer over the first orientation film, a second orientation film over the liquid crystal layer, and a plurality of second electrodes located over the second orientation film, arranged in a stripe form, and extending in a second extending direction intersecting the first extending direction. More detailed structures will be explained in the specification.

18 Claims, 21 Drawing Sheets

(56)        References Cited

U.S. PATENT DOCUMENTS

| | | | |
|---|---|---|---|
| 2017/0235194 A1* | 8/2017 | Shin | G02F 1/13439 |
| | | | 349/139 |
| 2019/0204640 A1 | 7/2019 | Li et al. | |
| 2022/0128869 A1 | 4/2022 | Tanaka et al. | |
| 2022/0235918 A1 | 7/2022 | Koito et al. | |

FOREIGN PATENT DOCUMENTS

| | | | |
|---|---|---|---|
| JP | 2014-160277 A | 9/2014 | |
| JP | 2022-070474 A | 5/2022 | |
| WO | WO-2019103987 A1 * | 5/2019 | G06F 3/0488 |
| WO | WO2021/100361 A1 | 5/2021 | |

* cited by examiner

<u>100</u>

120

120

Orientation direction

Figure 15:
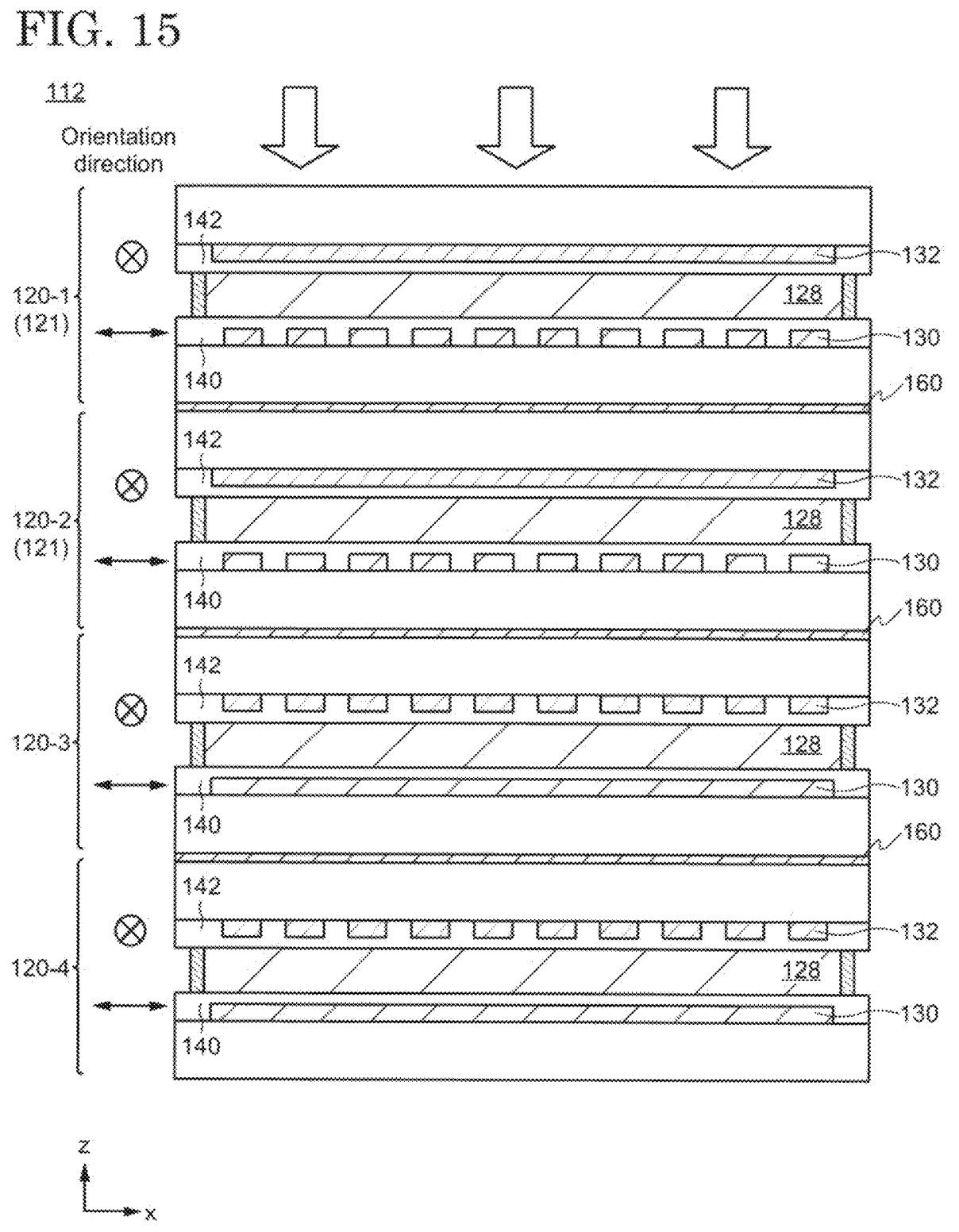

Orientation
direction 120-1
(121)

120-2
(121)

120-3

120-4

142
132
128
130
160

142
132
128
130
160

142
132
128
130
160

142
132
128
130

140

140

140

140 z x

112

Orientation direction

142

132

120-1 (121)

128

130

140

160

142

132

120-2

128

130

140

160

142

132

120-3

128

130

140

160

142

132

120-4 (121)

128

130

140 z
x

OPTICAL ELEMENT AND LIGHTING DEVICE INCLUDING THE OPTICAL ELEMENT

CROSS-REFERENCE TO RELATED APPLICATIONS

This application is a Continuation of International Patent Application No. PCT/JP2023/019059, filed on May 23, 2023, which claims the benefit of priority to Japanese Patent Application No. 2022-090917, filed on Jun. 3, 2022, the entire contents of which are incorporated herein by reference.

FIELD

An embodiment of the present invention relates to an optical element and a lighting device including the optical element. For example, an embodiment of the present invention relates to a lighting device including a light source and an optical element capable of arbitrarily controlling the irradiation area of the light from the light source.

BACKGROUND

In recent years, lighting devices have been developed which can control the irradiation area and irradiation distance of a light source by controlling the light emitted from the light source using an optical element containing liquid crystal. For example, Japanese Patent Application Publication No. 2014-160277 discloses an optical element having a liquid crystal layer and a pair of comb-shaped electrodes. Formation of a potential difference between the pair of comb-shaped electrodes changes the orientation of liquid crystal molecules in the liquid crystal layer to create a refractive-index distribution in the liquid crystal layer. Appropriate control of the refractive-index distribution allows the liquid crystal layer to function as a lens.

SUMMARY

An embodiment of the present invention is an optical element including a first liquid crystal cell, a second liquid crystal cell, a third liquid crystal cell, and a fourth liquid crystal cell arranged in this order to overlap one another. Each of the first liquid crystal cell, the second liquid crystal cell, the third liquid crystal cell, and the fourth liquid crystal cell includes: a plurality of first electrodes arranged in a stripe form and extending in a first extending direction; a first orientation film over the plurality of first electrodes; a liquid crystal layer over the first orientation film; a second orientation film over the liquid crystal layer; and a plurality of second electrodes located over the second orientation film, arranged in a stripe form, and extending in a second extending direction intersecting the first extending direction. In each of the first liquid crystal cell, the second liquid crystal cell, the third liquid crystal cell, and the fourth liquid crystal cell, the first orientation film and the second orientation film are configured to respectively orient liquid crystal molecules included in the liquid crystal layer in a first orientation direction and a second orientation direction intersecting each other when no voltage is applied to the plurality of first electrodes and the plurality of second electrodes, an angle between the first extending direction and the first orientation direction is equal to or less than 10°, and an angle between the second extending direction and the second orientation direction is equal to or less than 10°. The first extending direction of the first liquid crystal cell is at an angle equal to or greater than 0° and equal to or less than 10° with respect to the first extending direction of the second liquid crystal cell and is at an angle equal to or greater than 80° and equal to or less than 90° with respect to the first extending directions of the third liquid crystal cell and the fourth liquid crystal cell.

An embodiment of the present invention is an optical element including a first liquid crystal cell, a second liquid crystal cell, a third liquid crystal cell, and a fourth liquid crystal cell arranged in this order to overlap one another. Each of the first liquid crystal cell, the second liquid crystal cell, the third liquid crystal cell, and the fourth liquid crystal cell includes: a plurality of first electrodes arranged in a stripe form and extending in a first extending direction; a first orientation film over the plurality of first electrodes; a liquid crystal layer over the first orientation film; a second orientation film over the liquid crystal layer; and a plurality of second electrodes located over the second orientation film, arranged in a stripe form, and extending in a second extending direction intersecting the first extending direction. In each of the first liquid crystal cell, the second liquid crystal cell, the third liquid crystal cell, and the fourth liquid crystal cell, the first orientation film and the second orientation film are configured to respectively orient liquid crystal molecules included in the liquid crystal layer in a first orientation direction and a second orientation direction intersecting each other when no voltage is applied to the plurality of first electrodes and the plurality of second electrodes. In at least one of the first liquid crystal cell, the second liquid crystal cell, the third liquid crystal cell, and the fourth liquid crystal cell, an angle between the first extending direction and the first orientation direction is equal to or less than 10°, and an angle between the second extending direction and the second orientation direction is equal to or less than 10°. In at least one of the other liquid crystal cells, an angle between the first extending direction and the first orientation direction is equal to or greater than 80° and equal to or less than 90°, and an angle between the second extending direction and the second orientation direction is equal to or greater than 80° and equal to or less than 90°.

BRIEF DESCRIPTION OF DRAWINGS

FIG. 10 is a schematic view for explaining the operation of an optical element according to an embodiment of the present invention.

FIG. 15 is a schematic cross-sectional view of an optical element according to an embodiment of the present invention.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, the drawings are only an example, and do not limit the interpretation of the invention.

In the specification and the drawings, the same reference number is provided to an element that is the same as that which appears in preceding drawings, and a detailed explanation may be omitted as appropriate. The reference number is used when plural structures which are the same as or similar to each other are collectively represented, while a hyphen and a natural number are further used when these structures are independently represented.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure. In addition, a mode expressed by this expression includes a mode where a structure is not in contact with other structures.

First Embodiment

In the present embodiment, a lighting device 100 including an optical element 110 according to an embodiment of the present invention is explained.

1. Overall Structure

Figure 1:
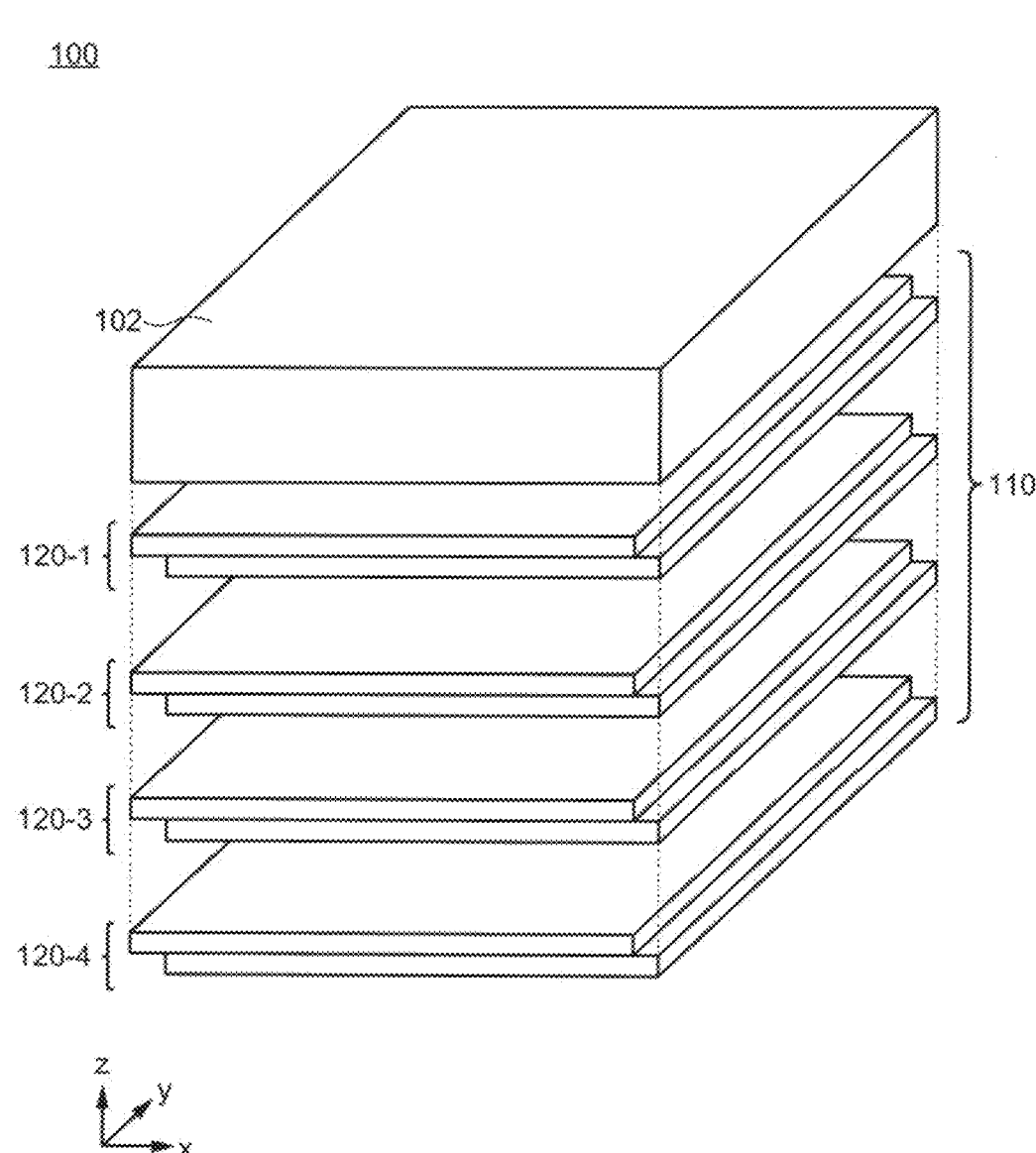
FIG. 1 is a schematic developed perspective view of a lighting device according to an embodiment of the present invention.

FIG. 1 shows a schematic developed perspective view of the lighting device 100. As shown in FIG. 1, the lighting device 100 includes, as basic components thereof, a light source 102 and an optical element 110 overlapping the light source 102. The light source 102 is configured to irradiate the optical element 110 with light and includes one or a plurality of light-emitting elements which is not illustrated. Examples of the light-emitting elements include organic or inorganic light emitting elements (LEDs). Organic LEDs are light-emitting elements in which a light-emitting organic compound is sandwiched between a pair of electrodes, while inorganic LEDs are light-emitting elements in which an inorganic light-emitting material such as aluminum gallium arsenide, gallium arsenide phosphorus, indium gallium nitride, gallium nitride, aluminum gallium nitride, and gallium phosphide is sandwiched between a pair of electrodes. The light source 102 is preferably configured so that collimated light with relatively high directivity is applied onto the optical element 110.

Figure 2A:
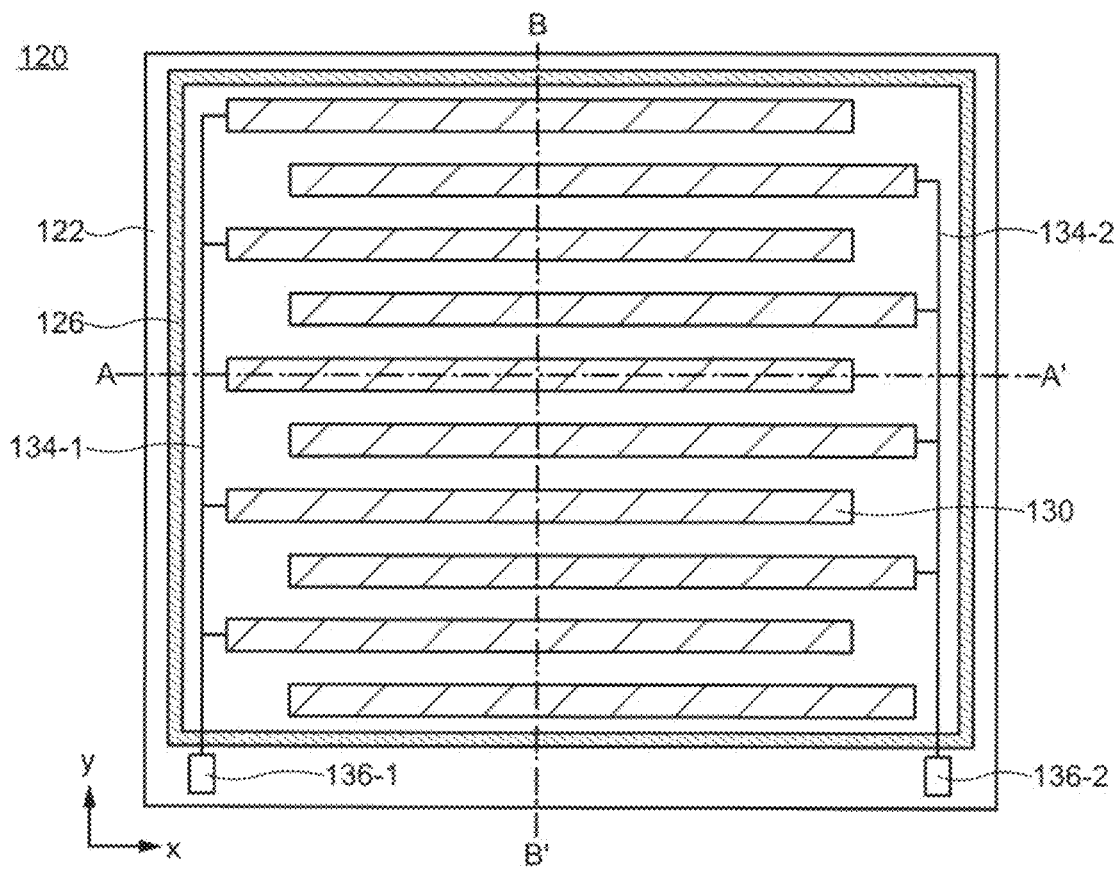
FIG. 2A is a schematic top view of an optical element according to an embodiment of the present invention.
Figure 2B:
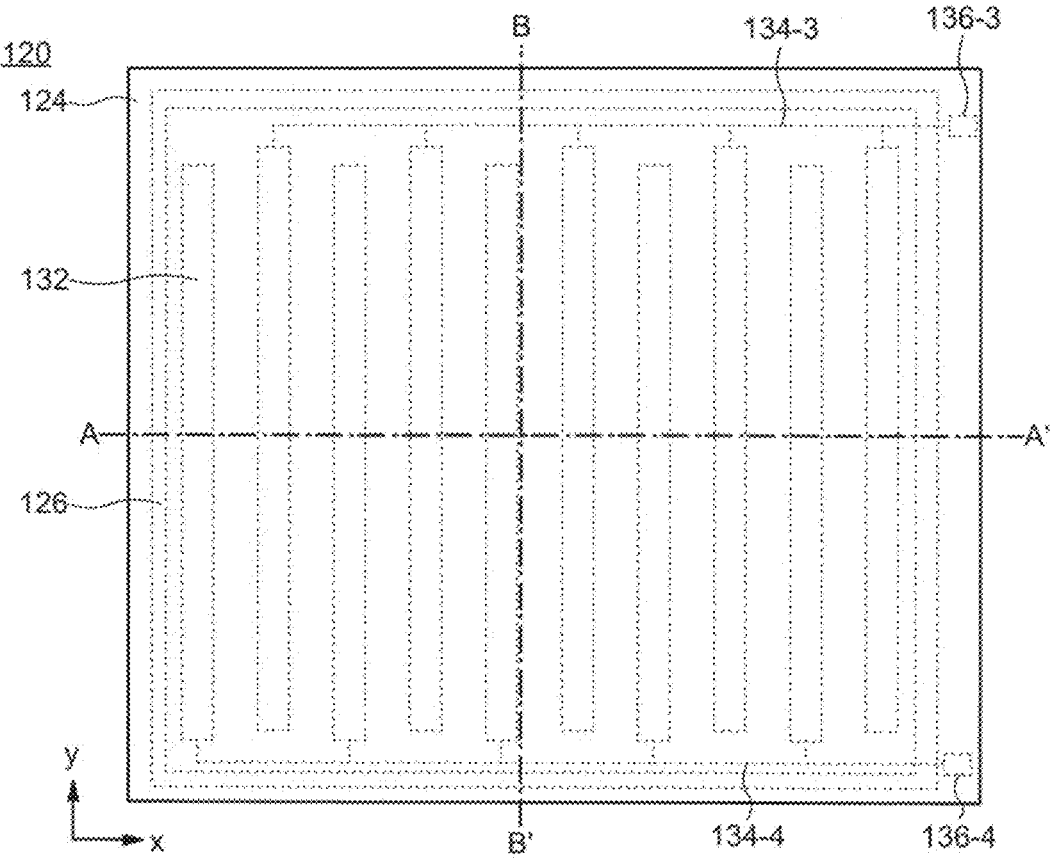
FIG. 2B is a schematic top view of an optical element according to an embodiment of the present invention.
Figure 3A:
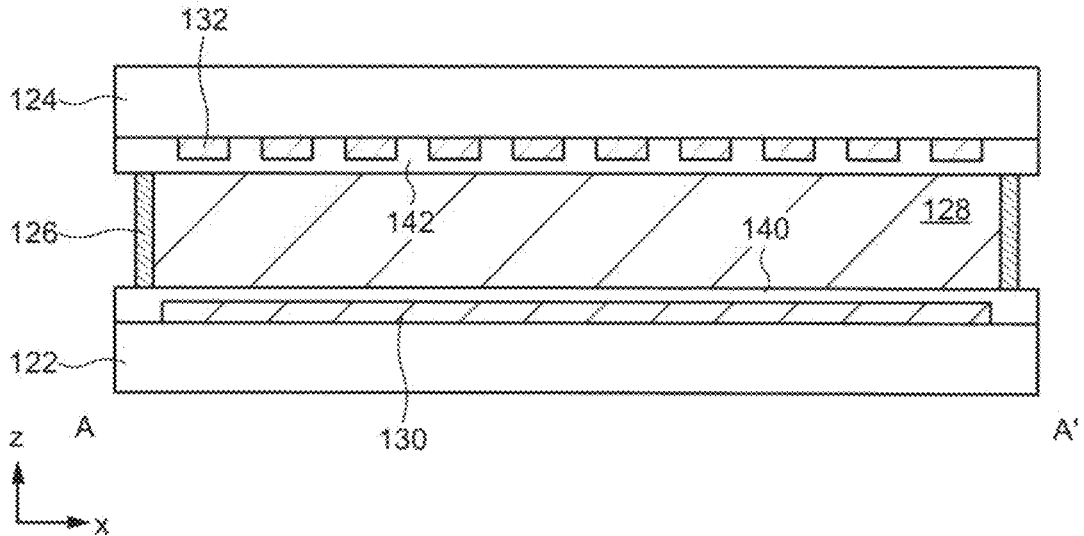
FIG. 3A is a schematic cross-sectional view of an optical element according to an embodiment of the present invention.
Figure 3B:
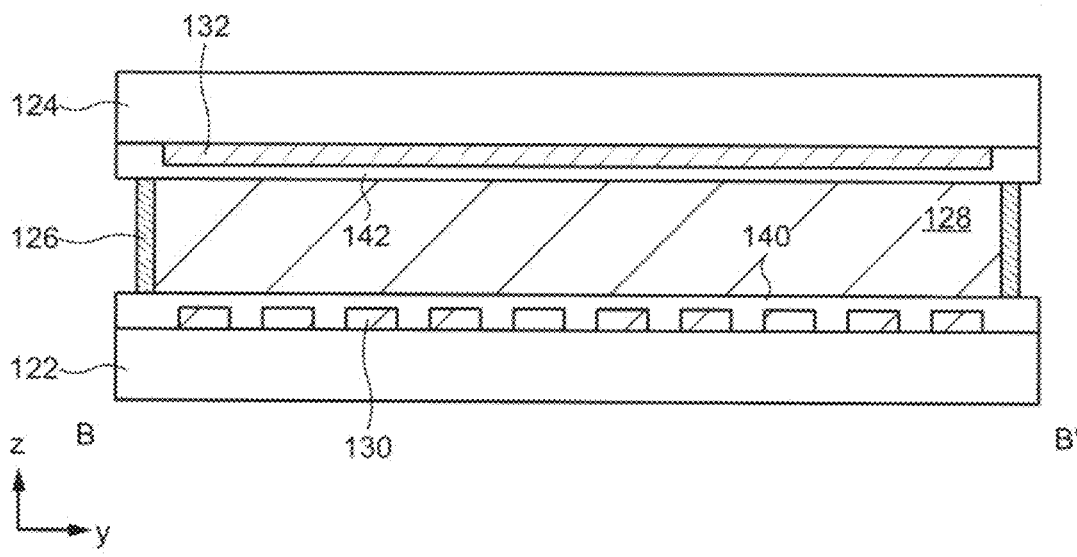
FIG. 3B is a schematic cross-sectional view of an optical element according to an embodiment of the present invention.

The optical element 110 overlaps the light source 102 and includes a plurality of liquid crystal cells 120 overlapping one another. There is no restriction on the number of the liquid crystal cells 120, and it is preferred that two, four, or more liquid crystal cells 120 be included in one optical element 110. Adjacent liquid crystal cells 120 are bonded to each other with a light-transmitting adhesive layer which is not illustrated in FIG. 1. As described in detail below, each liquid crystal cell 120 is composed of a pair of substrates and structural elements such as electrodes and a liquid crystal layer provided therebetween and has a function of diffusing the light from the light source 102. Hereafter, the main surface formed by the substrate is defined as a xy-plane, and the direction perpendicular to the xy-plane is defined as a z-direction. Accordingly, the optical element 110 overlaps the light source 102 in the z-direction, and the plurality of liquid crystal cells 120 also overlap each other in the z-direction. In the following description, an explanation is provided using a mode in which a first liquid crystal cell 120-1, a second liquid crystal cell 120-2, a third liquid crystal cell 120-3, and a fourth liquid crystal cell 120-4 are arranged in this order from the light source 102 side, 2. Liquid Crystal Cell Schematic top views of the liquid crystal cells 120 viewed from the light source 102 side are shown in FIG. 2A and FIG. 2B. In FIG. 2A, a counter substrate 124 is omitted from the pair of substrates (substrate 122 and counter substrate 124). FIG. 3A and FIG. 3B are schematic views of the cross sections along the chain lines A-A' and B-B' in FIG. 2A and FIG. 2B, respectively.

As can be understood from these drawings, each liquid crystal cell 120 includes a plurality of first electrodes 130 disposed over the substrate 122, a first orientation film 140 over the plurality of first electrodes 130, a liquid crystal layer 128 over the first orientation film 140, a second orientation film 142 over the liquid crystal layer 128, a plurality of second electrodes 132 over the second orientation film 142, and the counter substrate 124 over the plurality of second electrodes 132.

(1) Substrate and Counter Substrate

The substrate 122 and the counter substrate 124 are bonded to each other via a frame-shaped sealing material 126 and serve as base materials for respectively supporting the plurality of first electrodes 130 and the plurality of second electrodes 132 and encapsulating the liquid crystal layer 128. The substrate 122 and the counter substrate 124 are preferred to include a material exhibiting high transmittance with respect to the light from the light-emitting element 114 in order to allow the light from the light source 102 to pass therethrough to realize the illumination function. Therefore, it is preferable to configure the substrate 122 and the counter substrate 124 to include, for example, glass, quartz, or a polymeric material such as a polyimide, a polycarbonate, a polyester, and an acrylic resin. The substrate 122 and the counter substrate 124 may be configured to have a strength sufficient for inhibiting deformation by external forces or may be configured to be elastically deformed. As shown in FIG. 1, the substrate 122 and counter substrate 124 may be bonded such that a portion of the main surface of the substrate 122 is exposed from the counter substrate 124 toward the light source 102 side and a portion of the main surface of counter substrate 124 is exposed from the substrate 122 toward the opposite side with respect to the light source 102.

(2) First Electrode and Second Electrode

As shown in FIG. 3A and FIG. 3B, the plurality of first electrodes 130 is provided over the substrate 122 either in contact with the substrate 122 or via an undercoat which is not illustrated. The undercoat may be formed with one or a plurality of films containing a silicon-containing inorganic compound such as silicon nitride and silicon oxide. The first electrode 130 is preferably formed with a conductive oxide exhibiting high transmittance with respect to visible light, such as indium-tin oxide (ITO) and indium-zinc oxide (IZO), in order to provide a high light-transmitting property to the liquid crystal cell 120. Alternatively, the first electrode 130 may be composed of a mesh-shaped thin metal film having a plurality of openings to allow the light from the light source 102 to pass therethrough. As can be understood from FIG. 2A, the plurality of first electrodes 130 extends in the same direction as one another and is arranged in a stripe form. The length of each first electrode 130 (the length in the extending direction of the first electrode 130) depends on the size of the optical element 110 and may be selected from a range equal to or greater than 5 cm and equal to or less than 15 cm or equal to or greater than 1 cm and equal to or less than 10 cm, for example. The spacing between two adjacent first electrodes 130 may be selected from a range equal to or greater than 1 μm and equal to or less than 30 μm or equal to or greater than 3 μm and equal to or less than 20 μm, for example.

Similarly, the plurality of second electrodes 132 is also disposed over the counter substrate 124 (below the counter substrate 124 in FIG. 3A and FIG. 3B. The same is applied hereinafter.) either directly or via an undercoat. In order to provide a high light-transmitting property to the liquid crystal cell 120, it is preferred that the second electrodes 132 be formed with a conductive oxide exhibiting high transmittance with respect to visible light such as ITO and IZO or a mesh-shaped thin metal film having a plurality of openings. As shown in FIG. 2A to FIG. 3B, the plurality of second electrodes 132 also extends in the same direction as one another and is arranged in a stripe form. The length of each second electrode 132 (length in the extending direction of the second electrode 132) may also be selected from a range equal to or greater than 5 cm and equal to or less than 15 cm or equal to or greater than 1 cm and equal to or less than 10 cm. The spacing between two adjacent second electrodes 132 may also be selected from a range equal to or greater than from 1 μm and equal to or less than 30 μm or equal to or greater than 3 μm and equal to or less than 20 μm, for example.

Here, the plurality of first electrodes 130 and the plurality of second electrodes 132 are provided to intersect each other. The extending direction of the first electrodes 130 and the extending direction of the second electrodes 132 may be perpendicular to each other, but it is preferred that these directions are not completely perpendicular. For example, the angle between the extending direction of the first electrodes 130 and the extending direction of the second electrodes 132 may be set equal to or greater than 80° and equal to or less than 90°. Light interference caused by the first electrodes 130 and the second electrodes 132 can be suppressed and defects such as unintended coloration or generation of unevenness of the light from the light source 102 can be prevented by shifting the angle between the extending direction of the second electrodes 132 and the extending direction of the first electrodes 130 from a right angle.

A pulsed AC voltage (AC square wave) is applied to the plurality of first electrodes 130. However, the AC voltage is applied so that the phase is inverted between two adjacent first electrodes 130. Similarly, a pulsed AC voltage is also applied to the plurality of second electrodes 132 so that the phase is inverted between two adjacent second electrodes 132. The first electrodes 130 and the second electrodes 132 are configured so as to be independently driven. Thus, it is possible to apply the AC voltage only to the first electrodes 130 while applying no voltage or a constant voltage to the second electrodes 132, and vice versa.

As shown in FIG. 3A, the first electrodes 130 selected every other one from the plurality of first electrodes 130 is connected to a first wiring 134-1, and the remaining first electrodes 130 are also connected to a second wiring 134-2 different from the first wiring 134-1 (see FIG. 2A). The first wiring 134-1 and the second wiring 134-2 are exposed from the counter substrate 124 over the substrate 122 to form terminals 136-1 and 136-2, respectively. The AC voltage is applied through these terminals 136-1 and 136-2 from an external circuit which is not illustrated. Similarly, the second electrodes 132 selected every other one from the plurality of second electrodes 132 are connected to a third wiring 134-3, and the remaining second electrodes 132 are also connected to a fourth wiring 134-4 different from the third wiring 134-3 (FIG. 3B). The third wiring 134-3 and the fourth wiring 134-4 are exposed from the substrate 122 over the counter substrate 124 to form terminals 136-3 and 136-4, respectively, and the AC voltage is applied via these terminals 136-3 and 136-4 from the external circuit which is not illustrated. This configuration allows the plurality of first electrodes 130 on the substrate 122 side and the plurality of second electrodes 132 on the counter substrate 124 side to be independently driven. Furthermore, the first liquid crystal cell 120-1 to the fourth liquid crystal cell 120-4 can also be driven independently.

(3) Liquid Crystal Layer, First Orientation Film, and Second Orientation Film

Liquid crystal molecules are included in the liquid crystal layer 128. The structure of the liquid crystal molecules is not limited. Thus, the liquid crystal molecules may be nematic or smectic liquid crystals. Positive-type liquid crystals in which the dielectric constant in the long axis direction is greater than the dielectric constant in the direction perpendicular to the long axis are used as the liquid crystal molecules. The liquid crystal layer 128 is encapsulated in a space formed by the substrate 122, the counter substrate 124, and the sealing material 126 so as to be sandwiched between the first orientation film 140 and the second orientation film 142.

The thickness of the liquid crystal layer 128, i.e., the distance between the first orientation film 140 and the second orientation film 142, may also be arbitrary determined, but is preferred to be greater than the pitch of the first electrodes 130 or the second electrodes 132. For example, the thickness of the liquid crystal layer 128 is preferably set to be equal to or greater than 2 times and equal to or less than 10 times, equal to or greater than 2 times and equal to or less than 5 times, or equal to or greater than 2 times and equal to or less than 3 times the pitch of the first electrodes 130 or the second electrodes 132. The specific thickness of the liquid crystal layer 128 may be selected from a range equal to or greater than 10 μm and equal to or less than 60 μm or equal to or greater than 10 μm and equal to or less than 50 μm, for example. Although not illustrated, spacers may be provided in the liquid crystal layer 128 to maintain this thickness throughout each liquid crystal cell 120. If the thickness of the liquid crystal layer 128 described above is employed in a liquid crystal display device, the high responsiveness required for displaying moving images cannot be obtained, and it becomes difficult to express the functions of the liquid crystal display device.

The first orientation film 140 and the second orientation film 142 include a polymer such as a polyimide and a polyester and sandwich the liquid crystal layer 128. The first orientation film 140 is configured to orient the liquid crystal molecules included in the liquid crystal layer 128 in a certain direction in a situation where no potential difference is generated between adjacent first electrodes 130. Similarly, the second orientation film 142 is also configured to orient the liquid crystal molecules included in the liquid crystal layer 128 in a certain direction in a situation where no potential difference is generated between adjacent second electrodes 132. Hereinafter, the direction in which the first orientation film 140 and the second orientation film 142 orient the liquid crystal molecules in the absence of an electric field is referred to as the orientation direction. The orientation direction may be given, for example, by a rubbing process. Alternatively, the first orientation film 140 and second orientation film 142 may be provided with the orientation direction by photo-alignment. The photo-alignment is a rubbing-less alignment process using light. For example, the orientation film which has not been subjected to the rubbing process is irradiated with polarized light in the ultraviolet region from a predetermined direction. This process causes a photoreaction in the orientation film, by which anisotropy is introduced to the surface of the orientation film to provide the capability of controlling the orientation of liquid crystals.

Figure 4:
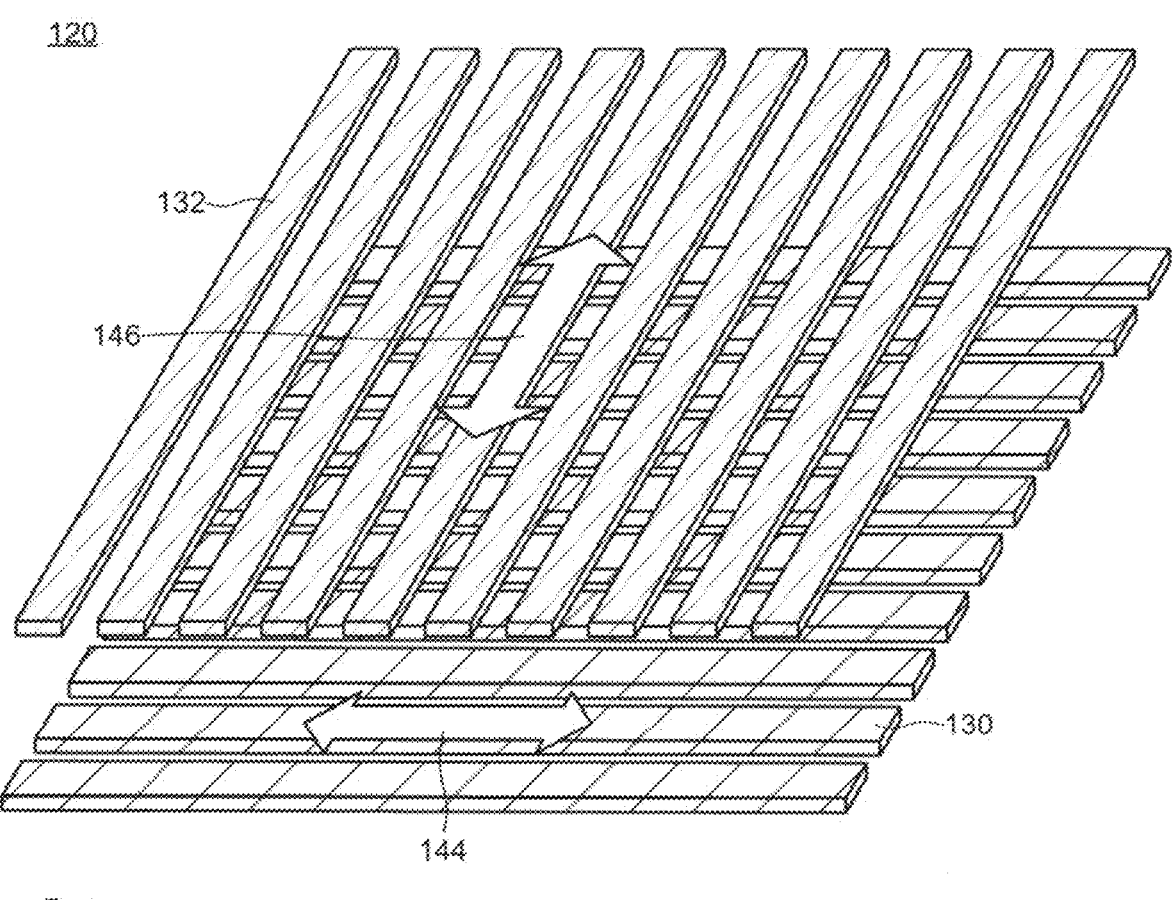
FIG. 4 is a schematic perspective view of a part of an optical element according to an embodiment of the present invention.
Figure 4:

Here, the first orientation film 140 and the second orientation film 142 are configured so that their orientation directions are orthogonal to each other or the angle therebetween is equal to or greater than 80° and equal to or less than 90° as shown in FIG. 4 (see white arrows 144 and 146 in FIG. 4).

Figure 5A:
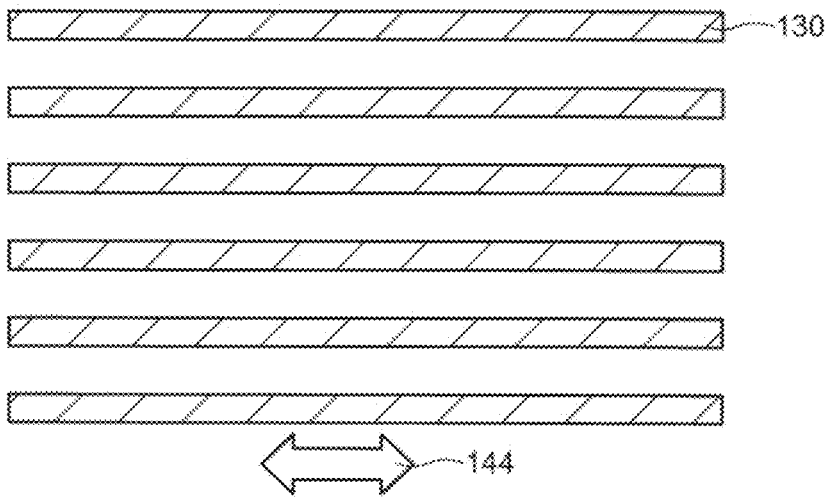
FIG. 5A is a schematic top view of a part of an optical element according to an embodiment of the present invention.
Figure 5B:
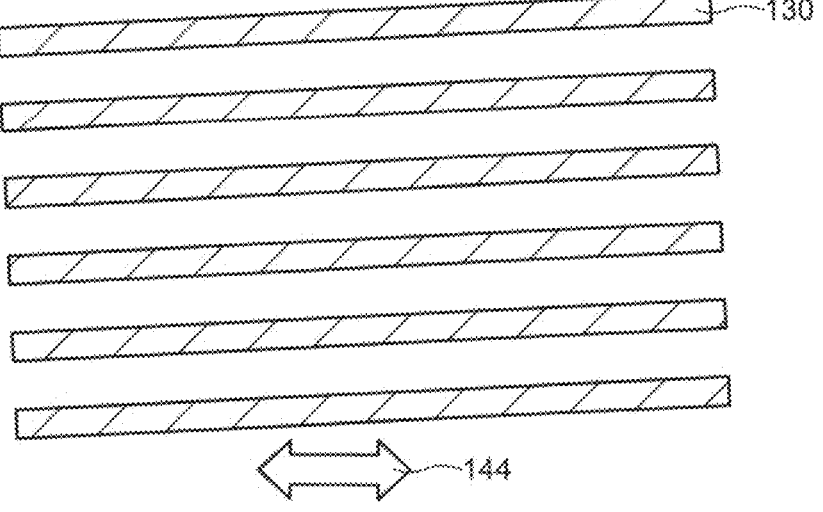
FIG. 5B is a schematic top view of a part of an optical element according to an embodiment of the present invention.

On the other hand, the plurality of first electrodes 130 and the first orientation film 140 may be arranged so that the extending direction of the plurality of first electrodes 130 and the orientation direction of the first orientation film 140 (see white arrow 144.) are parallel to each other as shown in FIG. 5A or may be arranged so that the extending direction of the plurality of first electrodes 130 is inclined from the orientation direction of the first orientation film 140 as shown in FIG. 5B. In the latter case, the angle between the extending direction of the plurality of first electrodes 130 and the orientation direction of the first orientation film 140 may be selected from a range greater than 0° and equal to or less than 10°, equal to or greater than 1° and equal to or less than 5°, or equal to or greater than 1° and equal to or less than 3°. The direction in which the liquid crystal molecules twist when a transverse electric field is generated can be fixed by inclining the extending direction of the plurality of first electrodes 130 from the orientation direction of the first orientation film 140, thereby improving the response of the liquid crystal molecules and preventing disorder in the refractive-index distribution of the liquid crystal layer 128 caused by variations in the rotation direction of the liquid crystal molecules.

Although not illustrated, the relationship between the plurality of second electrodes 132 and the second orientation film 142 is the same. That is, the plurality of second electrodes 132 and the second orientation film 142 may be arranged so that the extending direction of the plurality of second electrodes 132 is parallel to the orientation direction of the second orientation film 142 or may be arranged so that the extending direction of the plurality of second electrodes 132 is inclined from the orientation direction of the second orientation film 142 in a range greater than 0° and equal to or less than 10°, equal to or greater than 1° and equal to or less than 5, or equal to or greater than 1° and equal to or less than 3°. As described above, the inclination between the extending direction of the plurality of second electrodes 132 and the orientation direction of the second orientation film 142 improves the response of the liquid crystal molecules and allows the refractive-index distribution of the liquid crystal layer 128 to be precisely controlled. When the angle between the extending direction of the electrodes and the orientation direction of the orientation film covering the electrodes is greater than 0° and equal to or less than 10°, it may be referred to as "the extending direction of the electrodes and the orientation direction of the orientation film match each other".

Figure 5C:
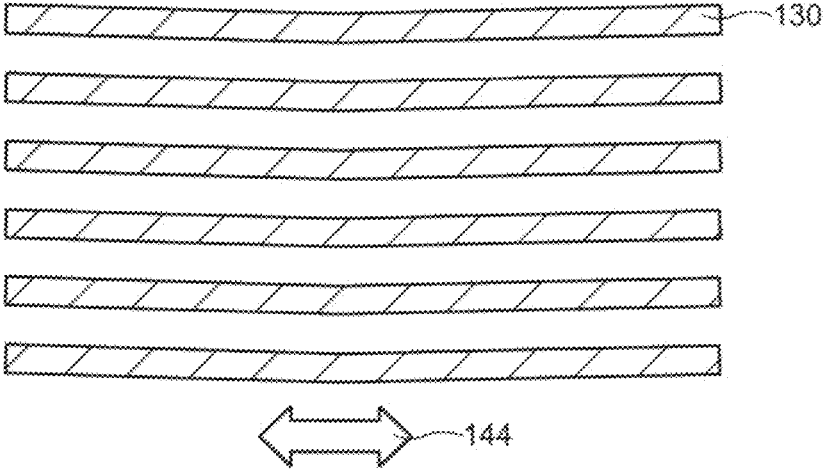
FIG. 5C is a schematic top view of a part of an optical element according to an embodiment of the present invention.

Here, the extending direction of each first electrode 130 is a direction from the intersection with the first wiring 134-1 or the second wiring 134-2 to the tip of the first electrode 130 when the entire first electrode 130 has a straight-line shape. However, each first electrode 130 may have a bent structure including a plurality of linear portions as shown in FIG. 5C. In this case, the plurality of first electrodes 130 is arranged so that the extending direction of at least one linear portion is inclined from the orientation direction of the first orientation film 140 at an angle greater than 0° and equal to or less than 10°, equal to or greater than 1° and equal to or less than 5°, or equal to or greater than 1° and equal to or less than 3°. The same is applied to the second electrodes 132. That is, the extending direction of each second electrode 132 is a direction from the intersection with the third wiring 134-3 or the fourth wiring 134-4 to the tip of the second electrode 132 when the entire second electrode 132 has a straight-line shape. Although not illustrated, each second electrode 132 may also have a bent structure including a plurality of linear portions. In this case, the plurality of second electrodes is arranged so that the extending direction of at least linear portion is inclined from the orientation direction of the second orientation film 142 at an angle greater than 0° and equal to or less than 10°, equal to or greater than 1° and equal to or less than 5°, or equal to or greater than 1° and equal to or less than 3°. Thus, it is possible to regulate the rotation direction of the liquid crystal molecules and precisely control the refractive-index distribution by forming one or a plurality of linear portions inclined from the orientation direction of the first orientation film 140 or the second orientation film 142 in each of the plurality of first electrodes 130 and the plurality of second electrodes 132.

Figure 6:
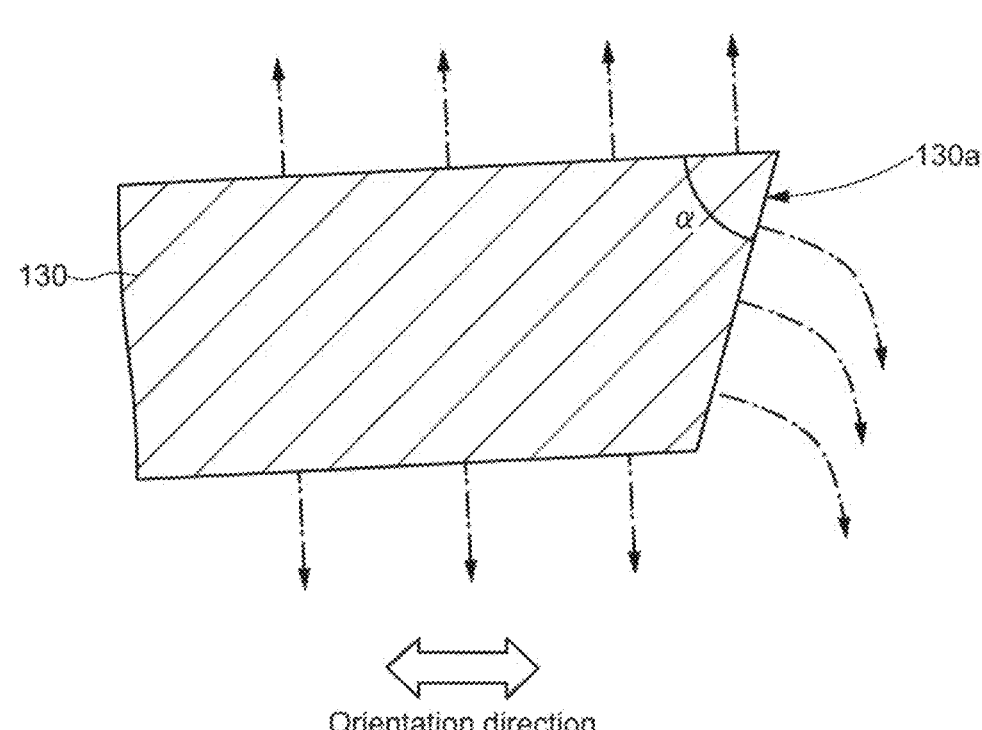
FIG. 6 is a schematic top view of a part of an optical element according to an embodiment of the present invention.

Note that it is preferable to configure all of or at least one of the first electrodes 130 to have, at a tip thereof, a straight edge (edge 130*a* in FIG. 6) inclined from the orientation direction of the first orientation film 140 in order to more precisely regulate the rotation direction of the liquid crystal molecules. In other words, it is preferable to configure all of or at least one of the first electrodes 130 so that the tip thereof has an acute angle. It is possible to prevent the direction of the transverse electric field from being perpendicular to the orientation direction of the first orientation film at the tip by configuring each first electrode 130 in this way when a potential difference is provided between adjacent first electrodes, thereby regulating the rotation direction of the liquid crystal. The same is applied to the second electrode 132.

3. Arrangement of Plurality of Liquid Crystal Cells in Optical Element

Figure 7:
FIG. 7 is a schematic cross-sectional view of an optical element according to an embodiment of the present invention.

The arrangement of the first liquid crystal cell 120-1 to the fourth 120-4 liquid crystal cell in this embodiment is explained using the schematic cross-sectional view in FIG. 7. In the following description, the extending direction of the first electrodes 130 and the second electrodes 132 and the orientation directions of the first orientation film 140 and the second orientation film 142 are explained using the x-direction and the y-direction orthogonally intersecting each other. However, as described above, the extending direction of the first electrodes 130 and the orientation direction of the first orientation film 140 may be parallel to each other or may be inclined from each other in each liquid crystal cell 120. Similarly, the extending direction of the second electrodes 132 and the orientation direction of the second orientation film 142 may be parallel to each other or may be inclined from each other in each liquid crystal cell 120. Furthermore, the orientation directions of the first orientation film 140 and the second orientation film 142 may be orthogonal or may intersect to deviate from a perpendicular angle in each liquid crystal cell 120. Hence, when referring to one direction in the following description, this direction includes not only the direction parallel to this direction, but also the direction inclined in the range greater than 0° and equal to or less than 10°, equal to or greater than 1° and equal to or less than 5°, or equal to or greater than 1° and equal to or less than 3°. In addition, a direction perpendicular to one direction includes not only the direction perpendicular to this direction, but also the direction intersecting this direction at an angle equal to or greater than 80° and equal to or less than 90°, equal to or greater than 85° and equal to or less than 89°, or equal to or greater than 87° and equal to or less than 89°. Similarly, a direction parallel to one direction includes not only the direction parallel to this direction, but also the direction inclined from this direction at an angle greater than 0° and equal to or less than 10°, equal to or greater than 1° and equal to or less than 5°, or equal to or greater than 1° and equal to or less than 3°.

As shown in FIG. 7, the first liquid crystal cell 120-1 to the fourth liquid crystal cell 120-4 with the same structure are arranged to overlap one another, and adjacent liquid crystal cells 120 are bonded with an adhesive layer 160 transmitting visible light in the optical element 110.

The first liquid crystal cell 120-1 and the second liquid crystal cell 120-2 have the same arrangement. Specifically, both the first liquid crystal cell 120-1 and the second liquid crystal cell 120-2 are arranged so that the plurality of first electrodes 130 each extends in one direction (here, the y-direction) and the plurality of second electrodes 132 each extends in a direction intersecting that direction (here, the x-direction). Accordingly, the orientation directions of the first orientation film 140 and the second orientation film 142 are in the y-direction and the x-direction, respectively, in each of the first liquid crystal cell 120-1 and the second liquid crystal cell 120-2. In other words, the extending directions of the plurality of first electrodes 130 and the plurality of second electrodes 132 are orthogonal to each other and are parallel to the orientation directions of the first orientation film 140 and the second orientation film 142, respectively, in each of the first liquid crystal cell 120-1 and the second liquid crystal cell 120-2.

On the other hand, although the third liquid crystal cell 120-3 and the fourth liquid crystal cell 120-4 have the same arrangement as each other, they have a different arrangement from that of the first liquid crystal cell 120-1 or the second liquid crystal cell 120-2. Specifically, both the third liquid crystal cell 120-3 and the fourth liquid crystal cell 120-4 are arranged such that the plurality of first electrodes 130 extends in the x-direction and the plurality of second electrodes 132 extends in the y-direction. Thus, the orientation directions of the first orientation film 140 and the second orientation film 142 are in the x and y-directions, respectively, in each of the third liquid crystal cell 120-3 and the fourth liquid crystal cell 120-4. The extending directions of the plurality of first electrodes 130 and the plurality of second electrodes 132 are also orthogonal to each other and parallel to the orientation directions of the first orientation film 140 and the second orientation film 142, respectively, in each of the third liquid crystal cell 120-3 and the fourth liquid crystal cell 120-4.

Note that the extending direction of the first electrodes 130 of the first liquid crystal cell 120-1 may be completely parallel to the extending direction of the first electrodes 130 of the second liquid crystal cell 120-2, or the angle between these directions may be greater than 0° and equal to or less than 10°, equal to or greater than 1° and equal to or less than 5°, or equal to or greater than 1° and equal to or less than 3°. Similarly, the extending direction of the second electrodes 132 of the first liquid crystal cell 120-1 may be completely parallel to the extending direction of the second electrodes 132 of the second liquid crystal cell 120-2, or the angle between these directions may be greater than 0° and equal to or less than 10°, equal to or greater than 1° and equal to or less than 5°, or equal to or greater than 1° and equal to or less than 3°. Furthermore, the extending direction of the second electrodes 132 of the first liquid crystal cell 120-1 may be completely perpendicular to the extending direction of the first electrodes 130 of the second liquid crystal cell 120-2, or the angle between these directions may be equal to or greater than 80° and less than 90°, equal to or greater than 85° and equal to or less than 89°, or equal to or greater than 87° and equal to or less than 89°. Similarly, the extending direction of the first electrodes 130 of the first liquid crystal cell 120-1 may be completely perpendicular to the extending direction of the second electrodes 132 of the second liquid crystal cell 120-2, or the angle between these directions may be equal to or greater than 80° and less than 90°, equal to or greater than 85° and equal to or less than 89°, or equal to or greater than 87° and equal to or less than 89°. Thus, the extending directions of the first electrodes 130 and the second electrodes 132 may deviate from each other in the xy-plane between the first liquid crystal cell 120-1 and the second liquid crystal cell 120-2. Formation of such deviation suppresses the light interference and prevents the generation of unevenness in illumination. The same relationship may be established for the extending directions of the first electrode 130 and the second electrode 132 between the second liquid crystal cell 120-2 and the third liquid crystal cell 120-3 and between the third liquid crystal cell 120-3 and the fourth liquid crystal cell 120-4.

4. Light Distribution Control by Optical Element
(1) Light Diffusion in Each Liquid Crystal Cell The optical element 110 described above diffuses the light emitted from the light source 102 in a certain direction. Therefore, the light from the light source 102 can be processed to arbitral shapes by individually driving the plurality of liquid crystal cells 120, by which the light distribution of the lighting device 100 can be controlled to arbitrarily control the shape of the area in which the lighting device 100 illuminates an object (hereinafter, referred to as irradiation area). Here, the principle of the light diffusion in one liquid crystal cell 120 is explained.

(a) Non-Driving State

Figure 8A:
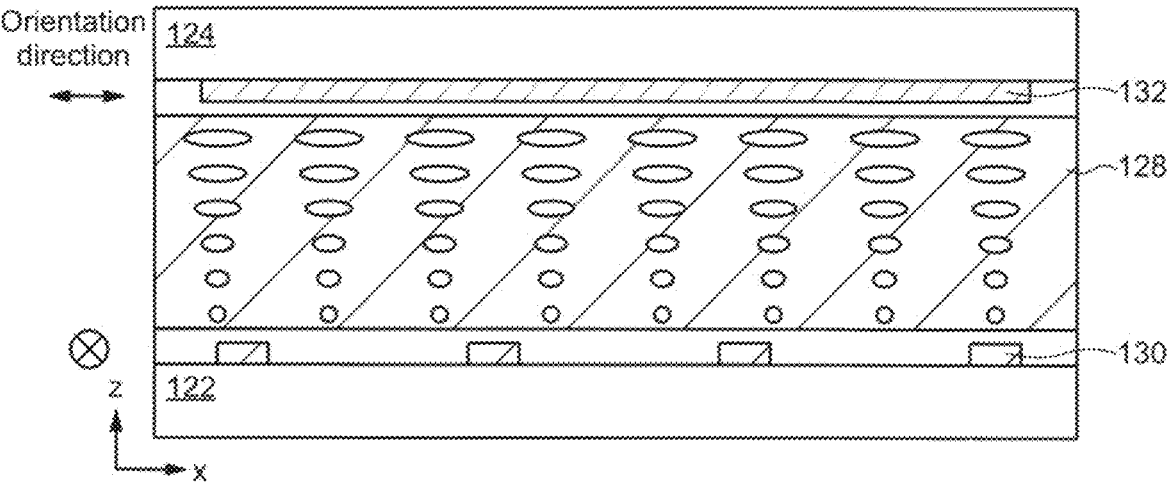
FIG. 8A is a schematic cross-sectional view for explaining the operation of an optical element according to an embodiment of the present invention.
Figure 8B:
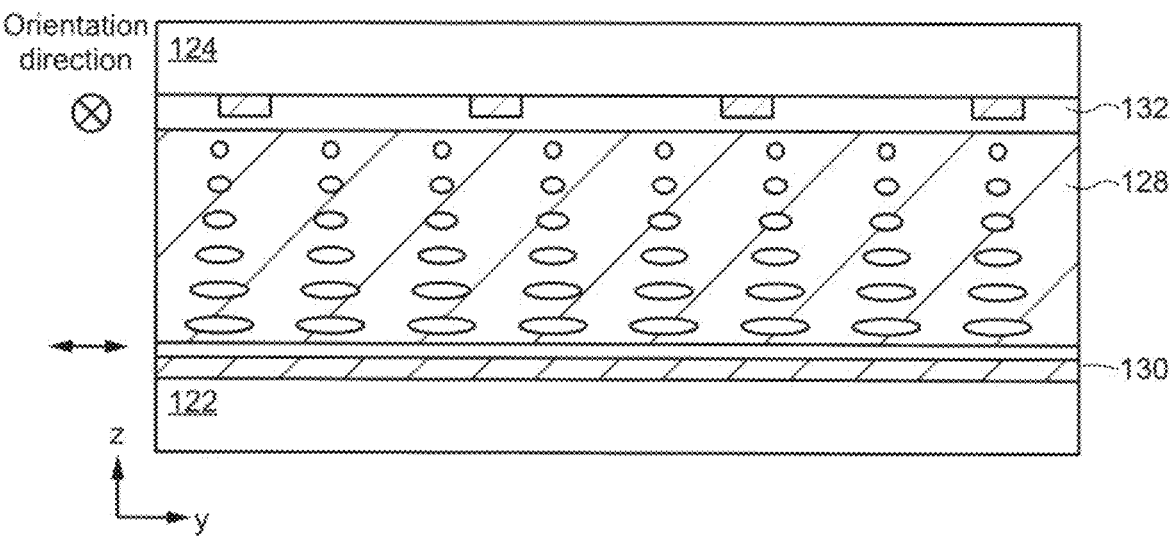
FIG. 8B is a schematic cross-sectional view for explaining the operation of an optical element according to an embodiment of the present invention.

Schematic cross-sectional views of one liquid crystal cell 120 in its non-driving state are shown in FIG. 8A and FIG. 8B. FIG. 8A is a schematic cross-sectional view obtained in the y-direction, while FIG. 8B is a schematic cross-sectional view obtained in the x-direction. In the following drawings, the liquid crystal molecules are represented by white ellipses or circles.

The case where the liquid crystal cells 120 are not driven is the case where no voltage or a constant voltage is applied to the plurality of first electrodes 130 and the plurality of second electrodes 132. In this case, no transverse electric field is generated between the plurality of first electrodes 130 and between the plurality of second electrodes 132. Since no electric field exists in the non-driving state, the liquid crystal molecules are oriented according to the orientation directions of the first orientation film 140 and the second orientation film 142. Therefore, the liquid crystal molecules are oriented along the orientation direction of the first orientation film 140 (in this case, the y-direction) near the substrate 122, rotate about the z-direction as a central axis as they approach the counter substrate 124, and eventually twist 90°. As a result, although the polarization components of the light emitted from the light source 102 rotate according to the twisted state of the liquid crystal molecules when passing through the liquid crystal layer from one substrate to the other (this phenomenon is called optical rotation), no phenomenon such as diffusion occurs since the liquid crystal molecules do not have any refractive-index distribution. Hence, the shape of the light emitted from the light source 102 is reflected in the shape of the irradiation area. When the light source 102 emits collimated light with relatively high directivity, a relatively narrow area can be selectively irradiated.

(b) Driving State

A mode of the driving state of the liquid crystal cells 120 is a mode where a pulsed AC voltage is applied to the plurality of first electrodes 130 and the plurality of second electrodes 132 so that the phase is inverted between adjacent first electrodes 130 and between adjacent second electrodes 132. The frequency of the AC voltage is the same within each liquid crystal cell 120. The AC voltage may be selected from a range equal to or greater than 3 V and equal to or less than 50 V or equal to or greater than 3 V and equal to or less than 30 V, for example. Since the extending directions of the first electrodes 130 and the second electrodes 132 are orthogonal or intersect at an angle equal to or greater than 80° and less than 90°, equal to or greater than 85° and equal to or less than 89°, or equal to or greater than 87° and equal to or less than 89°, the application of the AC voltage generates transverse electric fields between the adjacent first electrodes 130 and between the adjacent second electrodes 132, which are orthogonal to each other or intersect at an angle equal to or greater than 80° and less than 90°. An electric field (vertical electric field) is also generated between the first electrode 130 and the second electrode 132. However, the thickness of the liquid crystal layer 128 is larger than the spacing between adjacent first electrodes 130 and between adjacent second electrodes 132. Therefore, each liquid crystal molecule is oriented according to the transverse electric field because the vertical electric field is significantly smaller than the transverse electric field and can be ignored.

Figure 9A:
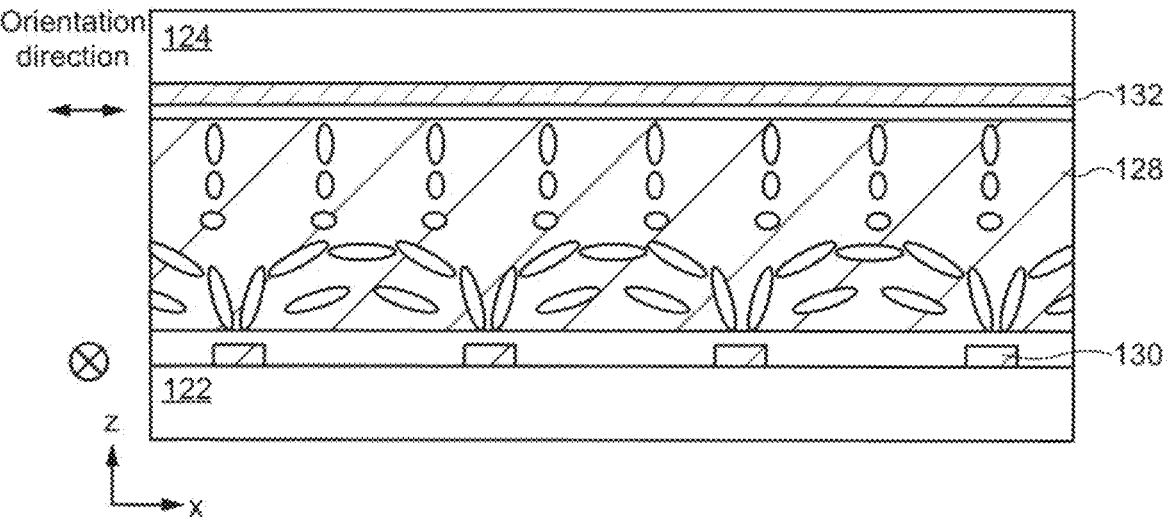
FIG. 9A is a schematic cross-sectional view for explaining the operation of an optical element according to an embodiment of the present invention.
Figure 9B:
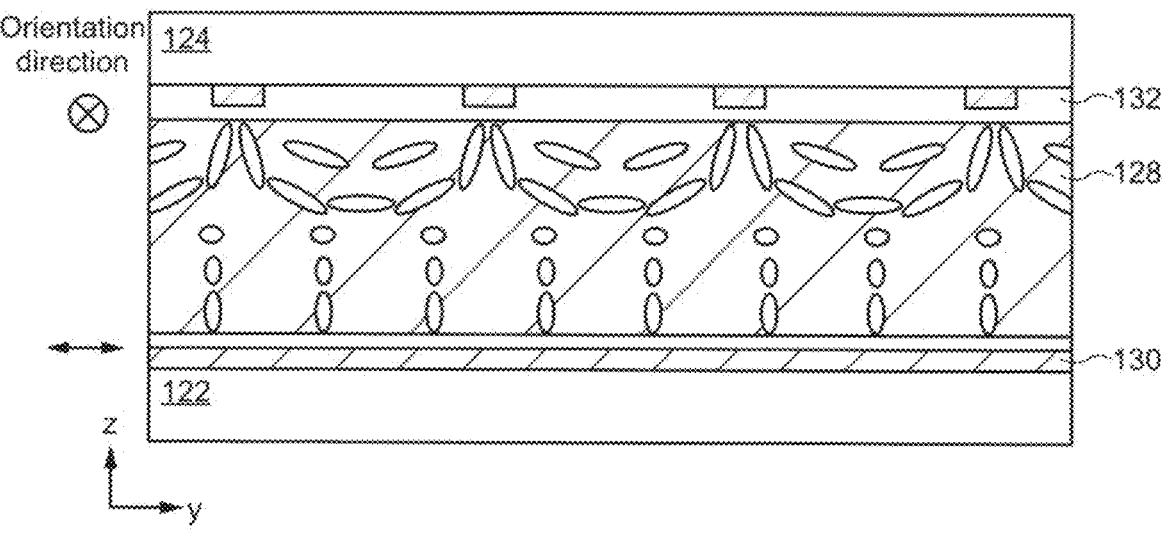
FIG. 9B is a schematic cross-sectional view for explaining the operation of an optical element according to an embodiment of the present invention.
Figure 10:
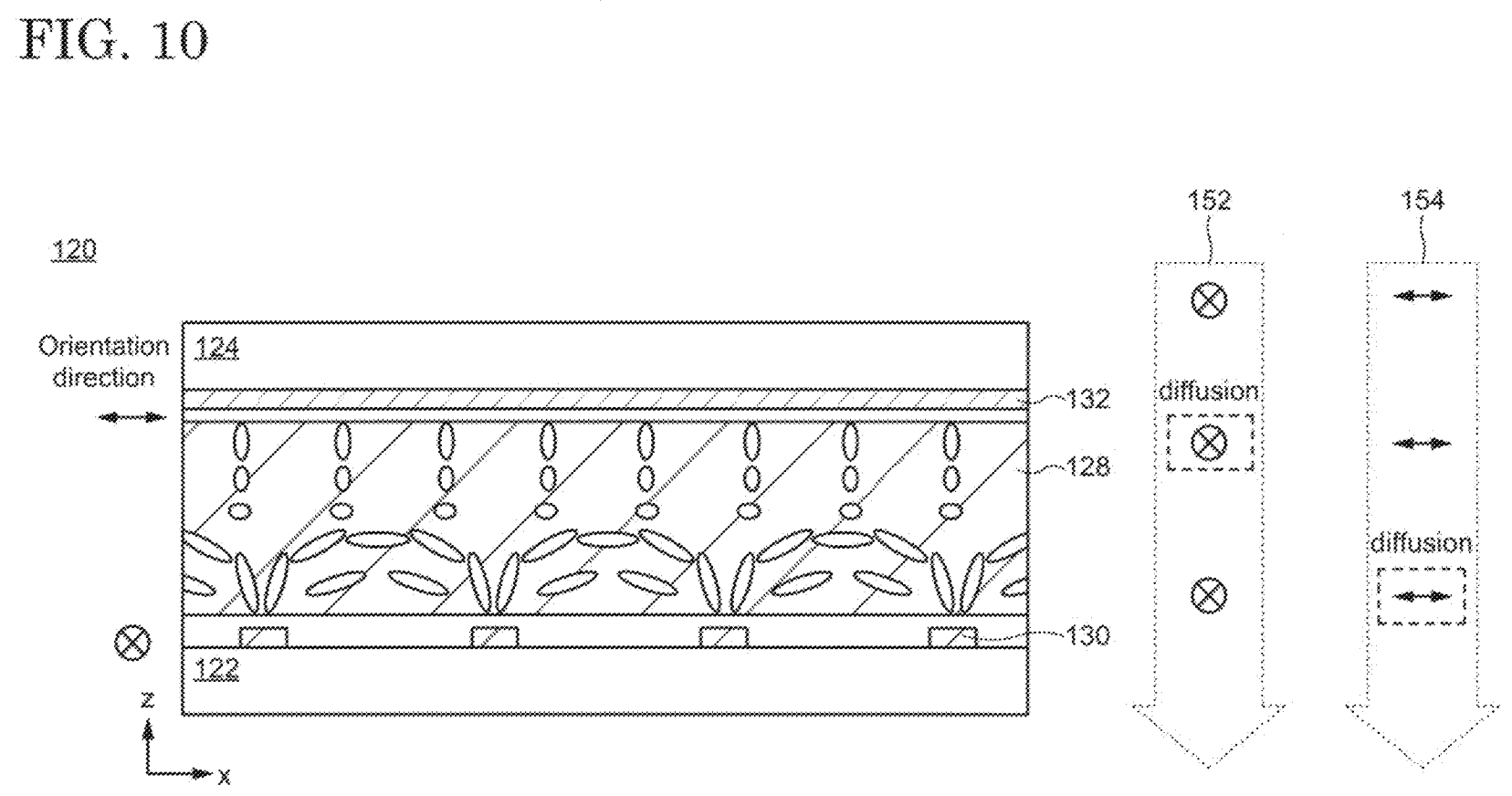

When a transverse electric field is generated in the liquid crystal layer 128, the liquid crystal molecules on the first electrode 130 side are oriented in an upwardly convex arc shape between adjacent first electrodes 130, while being oriented in the direction of the transverse electric field (FIG. 9A). The same is applied to the second electrode 132 side, where the liquid crystal molecules are oriented in a downwardly convex arc shape between adjacent second electrodes 132, while being oriented in the direction of the transverse electric field (FIG. 9B). This orientation change of the liquid crystal molecules creates a refractive-index distribution in the liquid crystal layer 128. As a result, the component (polarization component) 152 of the light incident on the liquid crystal layer 128 from the counter substrate 124 of the liquid crystal cell 120, which is parallel to the transverse electric field formed by the second electrodes 132, is diffused, while the other polarization component 154 is transmitted as shown in FIG. 10. Here, the liquid crystal molecules at the vicinity of each substrate rotate along the respective directions of the electric fields (e.g., in a direction orthogonal to the orientation direction in the non-driving state) by driving the liquid crystal cell 120 to form electric fields between adjacent first electrodes 130 and between adjacent second electrodes 132. As a result, the orientation state realized in the non-driving state, i.e., the twisted state, in which the direction of the liquid crystal molecules gradually rotates as they approach the counter substrate 124 from the substrate 122 when viewed from the z-direction, is broken, and both polarization components 152 and 154 do not optically rotate while passing through the liquid crystal layer 128. Therefore, the polarization components 152 and 154 maintain the polarization directions thereof before and after passing through the first liquid crystal cell 120-1, but are affected by the refractive-index distribution created by the liquid crystal molecules oriented in the direction consistent with the direction of the respective polarization components. More specifically, the polarization component 152 in the y-direction diffuses in the y-direction under the influence of the refractive-index distribution created by the liquid crystal molecules on the counter substrate 124 side, but the polarization axis in the x-direction is not changed. Meanwhile, the polarization component 154 in the x-direction diffuses in the x-direction under the influence of the refractive-index distribution created by the liquid crystal molecules on the substrate 122 side, but the polarization axis in the y-direction is not changed.

Figure 11:
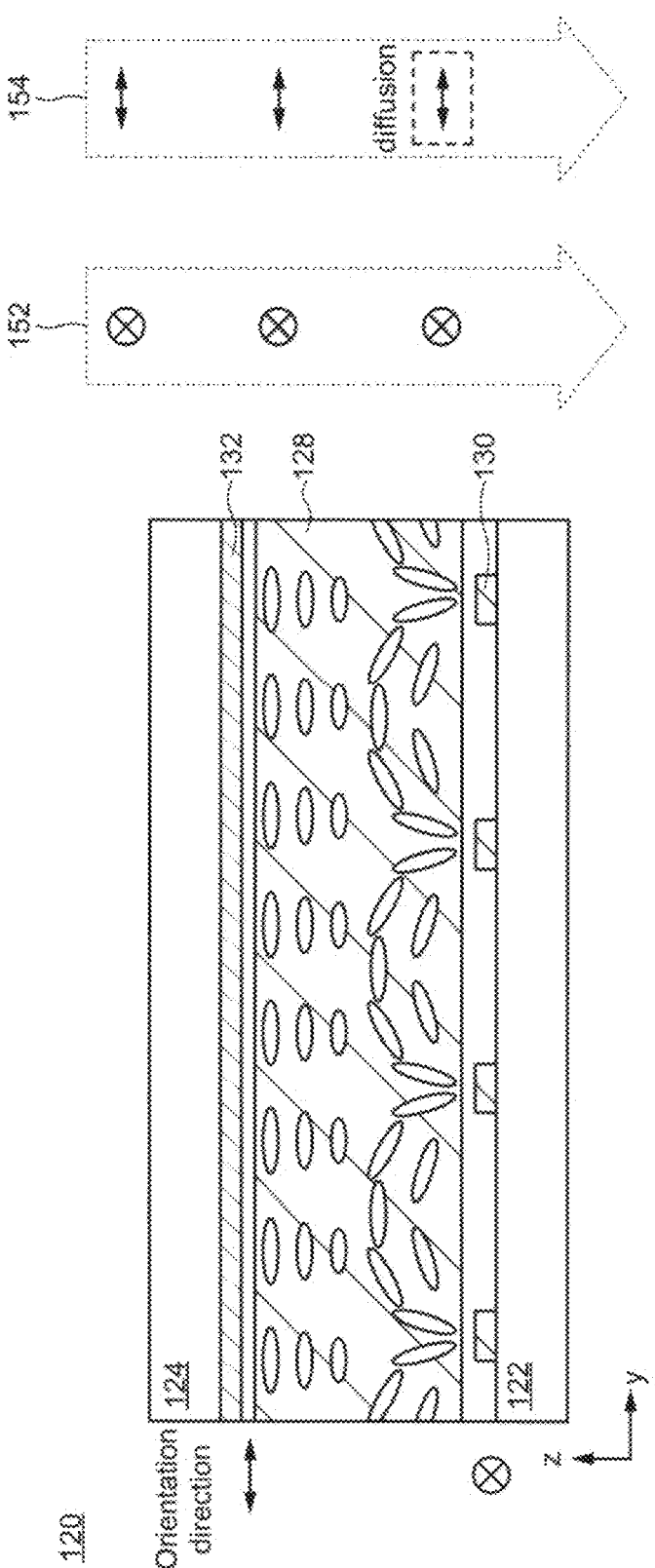
FIG. 11 is a schematic view for explaining the operation of an optical element according to an embodiment of the present invention.

Another mode in the driving state of the liquid crystal cell 120 is a mode where the pulsed AC voltage is applied to one of the plurality of first electrodes 130 and the plurality of second electrodes 132, while no voltage or a constant voltage is applied to the other. In this case, the AC voltage is still applied so that the phase is inverted between adjacent first electrodes 130 or between adjacent second electrodes 132. For example, when the pulsed AC voltage is applied to the plurality of first electrodes 130, the liquid crystal molecules are oriented in a convex arc shape between adjacent first electrodes 130, while being oriented in the direction of the transverse electric field on the substrate 122 side (FIG. 11), resulting in a refractive-index distribution in the liquid crystal layer 128. Therefore, the light incident on the liquid crystal layer 128 from the counter substrate 124 of the liquid crystal cell 120 is not diffused by the liquid crystal layer 128 on the second electrode 132 side as shown in FIG. 11. However, the polarization component 154 parallel to the

14 selectively diffused while maintaining the polarization directions of both polarization components 152 and 154 in this mode.

Without going into detail, the same is applied to the case where the pulsed AC voltage is applied to the plurality of second electrodes 132, while no voltage or a constant voltage is applied to the plurality of first electrodes 130. In this case, one component of the incident light (in this case, the polarization component 152) is selectively diffused by the liquid crystal layer 128 on the second electrode 132 side, while the other polarization component 154 is not diffused. In addition, both polarization components 152 and 154 do not optically rotate. Thus, the liquid crystal cell 120 is able to selectively diffuse one polarization component while maintaining the polarization directions of both polarization components 152 and 154 by forming a transverse electric field on one of the plurality of first electrodes 130 and the plurality of second electrodes 132.

The effects of the extending directions of the first electrodes 130 and the second electrodes 132, the orientation directions of the first orientation film 140 and the second orientation film 142, and whether the first electrodes 130 and the second electrodes 132 are driven or not on the light emitted from the light source 102 and incident from the counter substrate 124 side are summarized in Table 1. As shown in Table 1, two polarization components can be independently diffused or optically rotated at the same time by appropriately selecting the arrangement of the liquid crystal cell 120 (i.e., the extending directions of the first electrodes 130 and the second electrodes 132 or the orientation directions of the first orientation film 140 and the second orientation film 142) and determining whether the first electrodes 130 and the second electrodes 132 are driven or not.

TABLE 1

Relationship between the structure of liquid crystal cell 120 and behavior of incident light.

| Counter substrate side | | | Substrate side | | | x Polarization component | | y Polarization component | |
|---|---|---|---|---|---|---|---|---|---|
| Extending direction of second electrodes | Orientation direction of second orientation film | Driving or non-driving | Extending direction of first electrodes | Orientation direction of first orientation film | Driving or non-driving | Diffusion | Optical rotation | Diffusion | Optical rotation |
| x-direction | x-direction | non | y-direction | y-direction | non | x | o | x | o |
| | | yes | | | yes | o | x | o | x |
| y-direction | y-direction | non | x-direction | x-direction | non | x | o | x | o |
| | | yes | | | yes | o | x | o | x |
| x-direction | x-direction | yes | y-direction | y-direction | non | x | x | o | x |
| | | non | | | yes | o | x | x | x |
| y-direction | y-direction | yes | x-direction | x-direction | non | o | x | x | x |
| | | non | | | yes | x | x | o | x | direction of the transverse electric field on the first electrode 130 side is selectively diffused due to the refractive-index distribution created in the liquid crystal layer 128 on the first electrode 130 side, while the other polarization component 152 is not diffused. At this time, the orientation in the non-driving state is maintained, and the liquid crystal molecules are oriented in the y-direction in the liquid crystal layer 128 on the second electrode 132 side. In addition, the liquid crystal molecules also take an upwardly convex orientation state along the y-direction, which is the direction of the transverse electric field, on the first electrode 130 side. As a result, the aforementioned twisted state of the liquid crystal molecules at the non-driving state is eliminated, and both polarization components 152 and 154 do not optically rotate while passing through the liquid crystal layer 128. Therefore, only the polarization component 154 can be (2) Light Distribution Control by Optical Element As described above, the first liquid crystal cell 120-1 to the fourth liquid crystal cell 120-4 can be independently driven from each other, and furthermore, the plurality of first electrodes 130 and the plurality of second electrodes 132 can be independently driven in each liquid crystal cell 120. Hence, the light from the light source 102 can be processed into arbitral shapes in the optical element 110 according to the present embodiment by appropriately driving the plurality of first electrodes 130 and the plurality of second electrodes 132 of the first liquid crystal cell 120-1 to the fourth liquid crystal cell 120-4.

For example, assume a case where the light from the light source 102 is applied from the first liquid crystal cell 120-1 side of the optical element 110 and is extracted from the fourth liquid crystal cell 120-4 as shown in FIG. 7. Here, each liquid crystal cell 120 is driven according to Table 2. That is, the first electrodes 130 and the second electrodes 132 of all of the liquid crystal cells 120 are driven. In this case, the polarization component in the y-direction of the incident light is diffused in the y-direction once by each of the four liquid crystal cells 120, i.e., a total of four times, as shown in Table 2. Similarly, the polarization component in the x-direction is diffused in the x-direction a total of four times. Thus, the incident light providing a circular irradiation area can be changed into the light providing a cross-shaped irradiation area. In addition, coloration of the light can be prevented because each polarization component is diffused multiple times (e.g., at least three times) to allow the spectral state to be scattered accordingly. Note that the lengths in the x-direction and the y-direction of the cross shape can be adjusted by appropriately adjusting the AC voltages applied to the first electrodes 130 and the second electrodes 132. The hyphen in Table 2 means that the incident light is transmitted without diffusion or optical rotation, unless otherwise noted (the same is applied to the following tables).

TABLE 2

| Behavior of light incident on optical element 100 (1) | | | | | | |
|---|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| First liquid crystal cell | Second electrode | x direction | yes | x direction | Diffusion in y direction | — |
| | First electrode | y direction | yes | y direction | — | Diffusion in x direction |
| Second liquid crystal cell | Second electrode | x direction | yes | x direction | Diffusion in y direction | — |
| | First electrode | y direction | yes | y direction | — | Diffusion in x direction |
| Third liquid crystal cell | Second electrode | y direction | yes | y direction | — | Diffusion in x direction |
| | First electrode | x direction | yes | x direction | Diffusion in y direction | — |
| Fourth liquid crystal cell | Second electrode | y direction | yes | y direction | — | Diffusion in x direction |
| | First electrode | x direction | yes | x direction | Diffusion in y direction | — |

Alternatively, a portion of the four liquid crystal cells 120 may be driven. For example, the first electrodes 130 and the second electrodes 132 of the first liquid crystal cell 120-1, the second liquid crystal cell 120-2, and the fourth liquid crystal cell 120-4 are driven, while the first electrodes 130 and the second electrodes 132 of the third liquid crystal cell 120-3 are not driven as shown in Table 3. In this case, the polarization component of the incident light in the y-direction is diffused in the y-direction, the y-direction, and the x-direction by the first liquid crystal cell 120-1, the second liquid crystal cell 120-2, and the fourth liquid crystal cell 120-4, respectively, while the polarization component of the incident light in the x-direction is diffused in the x-direction, the x-direction, and the y-direction by the first liquid crystal cell 120-1, the second liquid crystal cell 120-2, and the fourth liquid crystal cell 120-4, respectively. As a result, the irradiation area can be greatly expanded while maintaining the shape of the irradiation area of the light source 102. In addition, the light coloration can be prevented by diffusing the respective polarization components numerous times (e.g., three or more times).

TABLE 3

| Behavior of light incident on optical element 100 (2) | | | | | | |
|---|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| First liquid crystal cell | Second electrode | x direction | yes | x direction | Diffusion in y direction | — |

TABLE 3-continued

| Behavior of light incident on optical element 100 (2) | | | | | | |
|---|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| | First electrode | y direction | yes | y direction | — | Diffusion in x direction |
| Second liquid crystal cell | Second electrode | x direction | yes | x direction | Diffusion in y direction | — |
| | First electrode | y direction | yes | y direction | — | Diffusion in x direction |
| Third liquid crystal cell | Second electrode | y direction | non | y direction | —[a] | —[a] |
| | First electrode | x direction | non | x direction | —[a] | —[a] |
| Fourth liquid crystal cell | Second electrode | y direction | yes | y direction | Diffusion in x direction | — |
| | First electrode | x direction | yes | x direction | — | Diffusion in y direction |

[a]Optically rotating by 90° by first liquid crystal cell

Alternatively, a portion of the four liquid crystal cells 120 may be driven according to Table 4. In this example, the second electrodes 132 of the first liquid crystal cell 120-1 and the second liquid crystal cell 120-2 as well as the first electrodes 130 of the fourth liquid crystal cell 120-4 are driven. In this case, the polarization component of the incident light in the y-direction is diffused in the y-direction by the first liquid crystal cell 120-1 and the second liquid crystal cell 120-2, while the polarization component of the incident light in the x-direction is diffused in the y-direction by the fourth liquid crystal cell 120-4. As a result, the incident light providing a circular irradiation area can be changed to the light providing a line-shaped irradiation area extended in the y-direction.

TABLE 4

| Behavior of light incident on optical element 100 (3) | | | | | | |
|---|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| First liquid crystal cell | Second electrode | x direction | yes | x direction | Diffusion in y direction | — |
| | First electrode | y direction | non | y direction | — | — |
| Second liquid crystal cell | Second electrode | x direction | yes | x direction | Diffusion in y direction | — |
| | First electrode | y direction | non | y direction | — | — |
| Third liquid crystal cell | Second electrode | y direction | non | y direction | —[a] | —[a] |
| | First electrode | x direction | non | x direction | —[a] | —[a] |
| Fourth liquid crystal cell | Second electrode | y direction | non | y direction | — | — |
| | First electrode | x direction | yes | x direction | — | Diffusion in y direction |

[a]Optically rotating by 90° by third liquid crystal cell

Alternatively, a portion of the four liquid crystal cells 120 may be driven according to Table 5. In this example, the first electrodes 130 of the first liquid crystal cell 120-1 and the second liquid crystal cell 120-2 as well as the second electrodes 132 of the fourth liquid crystal cell 120-4 are driven. In this case, the polarization component of the incident light in the y-direction is optically rotated by the third liquid crystal cell 120-3 to become a x polarization component which is further diffused in the x-direction by the fourth liquid crystal cell 120-4. On the other hand, the polarization component of the incident light in the x-direction is diffused in the x-direction by the first liquid crystal cell 120-1 and the second liquid crystal cell 120-2, which is further optically rotated by the third liquid crystal cell 120-3 to provide a polarization component in the y-direction. As a result, the incident light providing a circular irradiation area can be changed into the light providing a line-shaped irradiation area extended in the x-direction.

TABLE 5

Behavior of light incident on optical element 100 (4)

| Liquid crystal cell | Electrode | Electrode Extending direction | Driving or non-driving | Orientation direction of orientation film | Incident light y Polarization component | x Polarization component |
|---|---|---|---|---|---|---|
| First liquid crystal cell | Second electrode | x direction | non | x direction | — | — |
| | First electrode | y direction | yes | y direction | — | Diffusion in x direction |
| Second liquid crystal cell | Second electrode | x direction | non | x direction | — | — |
| | First electrode | y direction | yes | y direction | — | Diffusion in x direction |
| Third liquid crystal cell | Second electrode | y direction | non | y direction | —[a] | —[a] |
| | First electrode | x direction | non | x direction | —[a] | —[a] |
| Fourth liquid crystal cell | Second electrode | y direction | yes | y direction | Diffusion in x direction | — |
| | First electrode | x direction | non | x direction | — | — |

[a] Optically rotating by 90° by third liquid crystal cell

As described above, the light incident from the light source 102 can be changed by the optical element 110 into the light providing an arbitrarily shaped irradiation area in the lighting device 100 according to the present embodiment. In addition, since each polarization component of the incident light can be diffused numerous times (e.g., three or more times), coloration of the light with a modified light distribution can be prevented and the color of the light from the light source 102 can be reproduced. Thus, the lighting device 100 is capable of achieving a high degree of light distribution control without light coloration.

Second Embodiment

Figure 12:
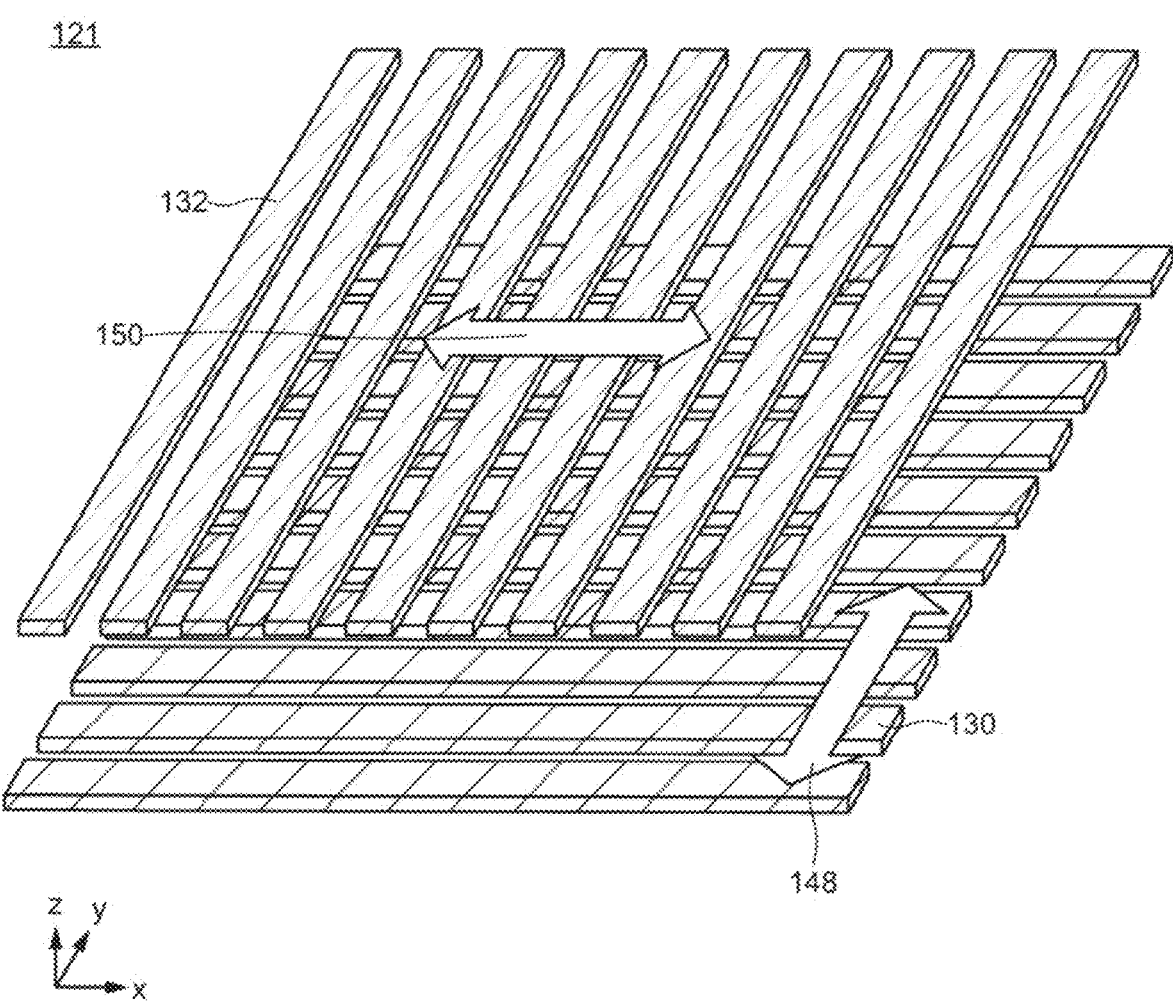
FIG. 12 is a schematic perspective view of a part of an optical element according to an embodiment of the present invention.
Figure 13A:
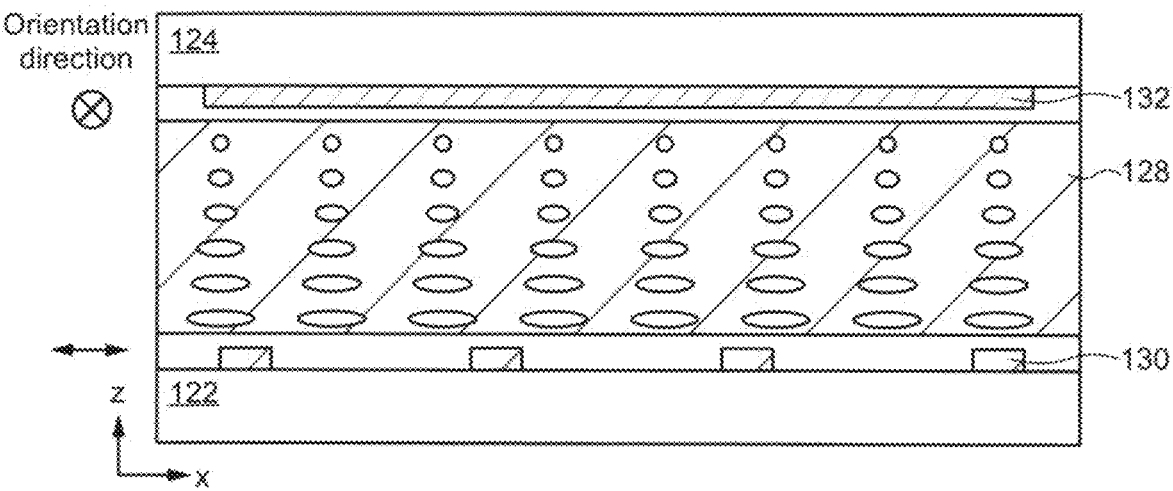
FIG. 13A is a schematic cross-sectional view for explaining the operation of an optical element according to an embodiment of the present invention.
Figure 13B:
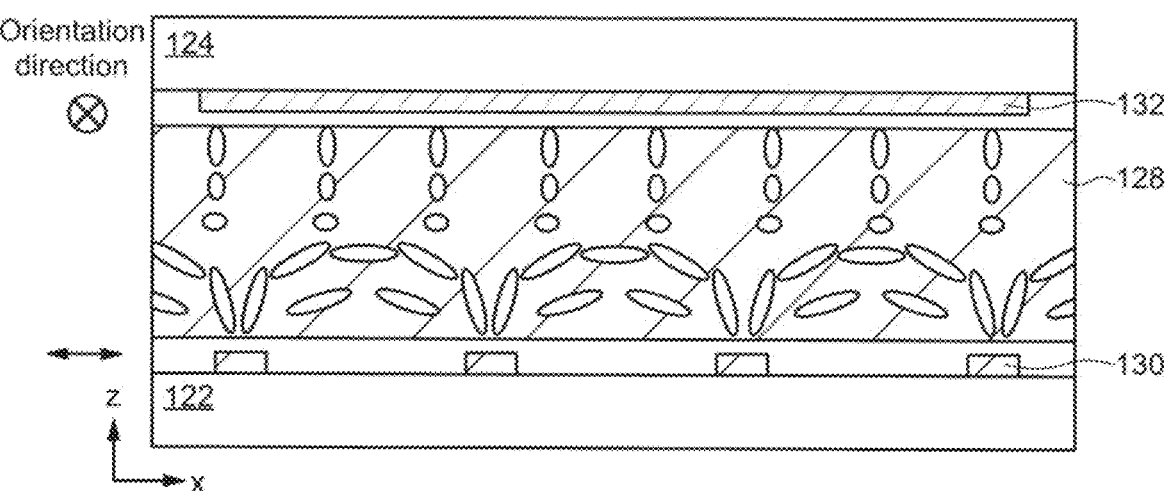
FIG. 13B is a schematic cross-sectional view for explaining the operation of an optical element according to an embodiment of the present invention.

In this embodiment, an optical element 112 having a different structure from the optical element 110 is explained. An explanation of the structures the same as or similar to those described in the First Embodiment may be omitted.
1. Structure of Optical Element and Light Distribution Control
As described in the First Embodiment, the first liquid crystal cells 120-1 to the fourth liquid crystal cells 120-4 included in the optical element 110 have the same structure as each other. In each liquid crystal cell 120, the extending direction of the plurality of first electrodes 130 and the orientation direction of the first orientation film 140 are parallel to each other or form an angle equal to or greater than 0° and equal to or less than 10°, and the extending direction of the plurality of second electrodes 132 and the orientation direction of the second orientation film 142 are also parallel to each other or form an angle equal to or greater than 0° and equal to or less than 10°.
In contrast, although at least one of the first liquid crystal cell 120-1 to the fourth liquid crystal cell 120-4 included in the optical element 112 has the same structure as the liquid crystal cell 120 described in the First Embodiment, the others have different structures. As described below, both polarization components of the incident light are optically rotated in the liquid crystal cells with different structures, regardless of whether the optical element 112 is driven or not. Therefore, the liquid crystal cell with different structures is hereinafter also referred to as an optical-rotation liquid crystal cell.
More specifically, as shown in FIG. 12, the extending direction of the plurality of first electrodes 130 and the orientation direction of the first orientation film 140 are orthogonal to each other or form an angle equal to or greater than 80° and less than 90°, and the extending direction of the plurality of second electrodes 132 and the orientation direction of the second orientation film 142 are also orthogonal to each other or form an angle equal to or greater than 80° and less than 90° in the optical-rotation liquid crystal cell 121 (see the arrows 148 and 150 in FIG. 12). Similar to the liquid crystal cell 120, the extending direction of the first electrodes 130 and the extending direction of the second electrodes 132 are orthogonal to each other or form an angle equal to or greater than 80° and equal to or less than 90°, and the orientation directions of the first orientation film 140 and the second orientation film 142 are also orthogonal to each other or form an angle equal to or greater than 80° and equal to or less than 90° in the rotational liquid crystal cell 121. When an angle between the extending direction of an electrode and the orientation direction of an orientation film covering the electrode is greater than 10° or more preferably when these angles are 80° to 90°, it can be said that "the extending direction of the electrode and the orientation direction of the orientation film intersect".
In the optical-rotation liquid crystal cell 121, the liquid crystal molecules are oriented according to the orientation directions of the first orientation film 140 and the second orientation film 142 in the non-driving state as shown in FIG. 13A. Therefore, the orientation direction of the liquid crystal molecules is the orientation direction of the first orientation film 140 at the vicinity of the substrate 122 (x-direction in this case) and rotates about the z-direction as a central axis as they approach the counter substrate 124 to be twisted by the difference in orientation direction between these orientation films (e.g., 90° when the orientation directions of these two orientation films are orthogonal). As a result, since the light emitted from the light source 102 only optically rotates without being diffused in the non-driving state of the liquid crystal cell 120, the shape of the light emitted from the light source 102 is reflected in the shape of the irradiation area. When the light source 102 emits collimated light with relatively high directivity, a relatively narrow area can be selectively irradiated.
On the other hand, when the optical-rotation liquid crystal cell 121 is driven by, for example, applying an AC voltage to the plurality of first electrodes 130 and the plurality of second electrodes 132, the liquid crystal molecules on the first electrode 130 side and the second electrode 132 side are oriented along the direction of the transverse electric fields similar to the liquid crystal cell 120 and are respectively oriented in upwardly and downwardly convex arc shapes between the first electrodes 130 and between the second electrodes 132 (FIG. 13B). However, the orientation direction in the xy-plane does not change because the liquid crystal molecules negligibly rotate in the xy-plane at this time. Therefore, the twist of the liquid crystal molecules about the z-direction as a central axis is maintained. Therefore, the polarization component of the light incident on the liquid crystal layer 128 from the counter substrate 124 of the liquid crystal cell 120, which is parallel to the transverse electric field created by the second electrodes 132, is optically rotated in the liquid crystal layer 128 after diffusing in the liquid crystal layer 128 on the second electrode 132 side and then diffuses in the liquid crystal layer 128 on the first electrode 130 side. In this way, optical rotation occurs simultaneously with diffusion in the driving state of the optical-rotation liquid crystal cell 121. Similar to the liquid crystal cell 120, it is also possible to selectively diffuse only one polarization component in one direction by applying an AC voltage to only one of the first electrodes 130 and the second electrodes 132. Even when an AC voltage is applied to only one of the first electrodes 130 and the second electrodes 132, both polarization components are optically rotated because the twist of the liquid crystal molecules about the z-direction as the central axis is maintained.

Figure 14:
FIG. 14 is a schematic cross-sectional view of an optical element according to an embodiment of the present invention.

There is no restriction on the number of liquid crystal cells 120 included in the optical element 112, and the third liquid crystal cell 120-3 may be the optical-rotation liquid crystal cell 121 and the others may be the liquid crystal cells 120 as shown in FIG. 14, for example. In this case, the first liquid crystal cell 120-1 to the fourth liquid crystal cell 120-4 may be arranged so that the extending direction of the first electrodes 130 of the first liquid crystal cell 120-1 is at an angle equal to or greater than 0° and equal to or less than 10° with respect to the extending direction of the first electrodes 130 of the second liquid crystal cell 120-2 and is at an angle equal to or greater than 80° and equal to or less than 90° with fourth liquid crystal cell 120-4 may be used as the optical-rotation liquid crystal cell, in addition to the third liquid crystal cell 120-3.

The driving method of the optical element 112 may also be determined as appropriate, and the light from the light source 102 can be changed into a variety of shapes by selecting the driving method. For example, the light from the light source 102 is applied to the optical element 112 from the first liquid crystal cell 120-1 side, and the optical element 112 is driven according to Table 6. That is, the first electrodes 130 and the second electrodes 132 of the first liquid crystal cell 120-1 and the second liquid crystal cell 120-2 and the second electrodes 132 of the third liquid crystal cell 120-3 serving as the optical-rotation liquid crystal cell 121 are driven. In this case, the polarization component of the incident light in the y-direction is diffused in the y-direction without being optically rotated by the first liquid crystal cell 120-1 and the second liquid crystal cell 120-2 and then diffused twice by the third liquid crystal cell 120-3 functioning as the optical-rotation liquid crystal cell 121-3 and the fourth liquid crystal cell 120-4 to return to the polarization component in the y-direction. On the other hand, the polarization component in the x-direction is diffused a total of three times in the x-direction by the first liquid crystal cell 120-1, the second liquid crystal cell 120-2, and the third liquid crystal cell 120-3 functioning as the optical-rotation liquid crystal cell 121 and is further optically rotated twice by the third liquid crystal cell 120-3 and the fourth liquid crystal cell 120-4 to return to the polarization component in the x-direction. Thus, the incident light providing a circular irradiation area can be changed to the light providing a cross-shaped irradiation area because the polarization components in the x-direction and the y-direction can be each diffused multiple times in the x-direction and the y-direction. In addition, since both polarization components are diffused numerous times (at least three times for the polarization component in the x-direction), light coloration can be effectively suppressed.

TABLE 6

| Behavior of light incident on optical element 112 (1) | | | | | | |
|---|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| First liquid crystal cell | Second electrode | x direction | yes | x direction | Diffusion in y direction | — |
| | First electrode | y direction | yes | y direction | — | Diffusion in x direction |
| Second liquid crystal cell | Second electrode | x direction | yes | x direction | Diffusion in y direction | — |
| | First electrode | y direction | yes | y direction | — | Diffusion in x direction |
| Third liquid crystal cell | Second electrode | y direction | yes | x direction | —[a] | Diffusion in x direction[a] |
| (Optical-rotation liquid crystal cell) | First electrode | x direction | non | y direction | —[a] | —[a] |
| Fourth liquid crystal cell | Second electrode | y direction | non | y direction | —[b] | —[b] |
| | First electrode | x direction | non | x direction | —[b] | —[b] |

[a]Optically rotating by 90° by third liquid crystal cell
[b]Optically rotating by 90° by fourth liquid crystal cell respect to the extending directions of the first electrodes 130 of the third liquid crystal cell 130-3 and the fourth liquid crystal cell 130-4. Note that a configuration may be employed in which any one or two of the first liquid crystal cell 120-1, the second liquid crystal cell 120-2, and the Alternatively, all of the four liquid crystal cells 120 may be driven according to Table 7. That is, the first electrodes 130 and second electrodes 132 of all of the liquid crystal cells 120 including the third liquid crystal cell 120-3 functioning as the optical-rotation liquid crystal cell 121 may be driven. By such driving, the polarization component of the incident light in the y-direction is respectively diffused in the y-direction, the y-direction, and the x-direction by the first liquid crystal cell 120-1, the second liquid crystal cell 120-2, and the fourth liquid crystal cell 120-4 without being optically rotated and is optically rotated by the third liquid crystal cell 120-3 (i.e., the optical-rotation liquid crystal cell 121) to become a polarization component in the x-direction. On the other hand, the polarization component in the x-direction is diffused in the x-direction by the first liquid crystal cell 120-1, the second liquid crystal cell 120-2, and the third liquid crystal cell 120-3, is optically rotated by the third liquid crystal cell 120-3, and is further diffused in the y-direction by the third liquid crystal cell 120-3 and the fourth liquid crystal cell 120-4. As a result, the incident light can be diffused in the x-direction and the y-direction while maintaining the circular irradiation area. In addition, since each polarization component is diffused numerous times (at least three times), light coloration can be effectively suppressed.

the first liquid crystal cell 120-1 and the second liquid crystal cell 120-2 are driven, and the first electrodes 130 of the third liquid crystal cell 120-3 and the fourth liquid crystal cell 120-4 may be driven. In this case, the polarization component of the incident light in the y-direction is diffused in the y-direction by the first liquid crystal cell 120-1 and the second liquid crystal cell 120-2 without being optically rotated and is then optically rotated by the third liquid crystal cell 120-3 (i.e., the optical-rotation liquid crystal cell 121) to become a polarization component in the x-direction. On the other hand, the polarization component in the x-direction is diffused in the y-direction by the third liquid crystal cell 120-3 and the fourth liquid crystal cell 120-4 and is optically rotated by the third liquid crystal cell 120-3 to become a polarization component in the y-direction. As a result, the incident light providing a circular irradiation area can be changed into the light providing a line-shaped irradiation area extended in the y-direction.

TABLE 7

| | | Electrode | | Orientation direction of | Incident light | |
|---|---|---|---|---|---|---|
| Liquid crystal cell | Electrode | Extending direction | Driving or non-driving | orientation film | y Polarization component | x Polarization component |
| First liquid crystal cell | Second electrode | x direction | yes | x direction | Diffusion in y direction | — |
| | First electrode | y direction | yes | y direction | — | Diffusion in x direction |
| Second liquid crystal cell | Second electrode | x direction | yes | x direction | Diffusion in y direction | — |
| | First electrode | y direction | yes | y direction | — | Diffusion in x direction |
| Third liquid crystal cell (Optical-rotation liquid crystal cell) | Second electrode | y direction | yes | x direction | —[a] | Diffusion in x direction[a] |
| | First electrode | x direction | yes | y direction | —[a] | Diffusion in y direction[a] |
| Fourth liquid crystal cell | Second electrode | y direction | yes | y direction | Diffusion in x direction | — |
| | First electrode | x direction | yes | x direction | — | Diffusion in y direction |

Table 7 title: Behavior of light incident on optical element 112 (2)

[a]Optically rotating by third liquid crystal cell

Alternatively, the optical element 112 may be driven according to Table 8. That is, the second electrodes 132 of

TABLE 8

| | | Electrode | | Orientation direction of | Incident light | |
|---|---|---|---|---|---|---|
| Liquid crystal cell | Electrode | Extending direction | Driving or non-driving | orientation film | y Polarization component | x Polarization component |
| First liquid crystal cell | Second electrode | x direction | yes | x direction | Diffusion in y direction | — |
| | First electrode | y direction | non | y direction | — | — |
| Second liquid crystal cell | Second electrode | x direction | yes | x direction | Diffusion in y direction | — |
| | First electrode | y direction | non | y direction | — | — |
| Third liquid crystal cell (Optical-rotation liquid crystal cell) | Second electrode | y direction | non | x direction | —[a] | —[a] |
| | First electrode | x direction | yes | y direction | —[a] | Diffusion in y direction[a] |

Table 8 title: Behavior of light incident on optical element 112 (3)

TABLE 8-continued

| Behavior of light incident on optical element 112 (3) | | | | | |
| | | Electrode | | Orientation direction of | Incident light | |
| Liquid crystal cell | Electrode | Extending direction | Driving or non-driving | orientation film | y Polarization component | x Polarization component |
|---|---|---|---|---|---|---|
| Fourth liquid crystal cell | Second electrode First electrode | y direction x direction | non yes | y direction x direction | — — | — Diffusion in y direction |

[a]Optically rotating by third liquid crystal cell

Alternatively, the optical element 112 may be driven according to Table 9. That is, the first electrodes 130 of the first liquid crystal cell 120-1 and the second liquid crystal cell 120-2 are driven, and the second electrodes 132 of the third liquid crystal cell 120-3 and the fourth liquid crystal cell 120-4 may be driven. In this case, the polarization component of the incident light in the y-direction is diffused in the x-direction by the fourth liquid crystal cell 120-4 without being optically rotated and is optically rotated by the third liquid crystal cell 120-3 (i.e., the optical-rotation liquid crystal cell 121) to become a polarization component in the x-direction. On the other hand, the polarization component in the x-direction is diffused in the x-direction by the first liquid crystal cell 120-1 and the second liquid crystal cell 120-2 and is diffused in the x-direction and optically rotated by the third liquid crystal cell 120-3 to become a polarization component in the y-direction. As a result, the incident light providing a circular irradiation area can be changed into the light providing a line-shaped irradiation area extended in the x-direction. The light coloration can also be effectively suppressed because at least one polarization component (polarization component in the x-direction) is also diffused numerous times (at least three times).

second liquid crystal cell 120-2 may each be the optical-rotation liquid crystal cell 121 as shown in FIG. 15. In this case, the first liquid crystal cell 120-1 to the fourth liquid crystal cell 120-4 may be arranged so that the extending direction of the first electrodes 130 of the first liquid crystal cell 120-1 is at an angle equal to or greater than 0° and equal to or less than 10° with respect to the extending direction of the first electrodes 130 of the second liquid crystal cell 120-2 and is at an angle equal to or greater than 80° and equal to or less than 90° with respect to the extending direction of the first electrodes 130 of the third liquid crystal cell 120-3 and the fourth liquid crystal cell 120-4.

The method of driving the optical element 112 according to this Modified Example 1 is also arbitrarily determined, and the optical element 112 may be driven according to Table 10, for example. That is, the second electrodes 132 of the first liquid crystal cell 120-1, the first electrodes 130 of the second liquid crystal cell 120-2, and the first electrodes 130 and the second electrodes 132 of the third liquid crystal cell 120-3 and the fourth liquid crystal cell 120-4 may be driven. In this case, the polarization component of the incident light in the y-direction is diffused in the y-direction by the first liquid crystal cell 120-1, the third liquid crystal

TABLE 9

| Behavior of light incident on optical element 112 (4) | | | | | |
| | | Electrode | | Orientation direction of | Incident light | |
| Liquid crystal cell | Electrode | Extending direction | Driving or non-driving | orientation film | y Polarization component | x Polarization component |
|---|---|---|---|---|---|---|
| First liquid crystal cell | Second electrode First electrode | x direction y direction | non yes | x direction y direction | — — | — Diffusion in x direction |
| Second liquid crystal cell | Second electrode First electrode | x direction y direction | non yes | x direction y direction | — — | — Diffusion in x direction |
| Third liquid crystal cell (Optical-rotation liquid crystal cell) | Second electrode First electrode | y direction x direction | yes non | x direction y direction | —[a] —[a] | Diffusion in x direction[a] —[a] |
| Fourth liquid crystal cell | Second electrode First electrode | y direction x direction | yes non | y direction x direction | Diffusion in x direction — | — — |

[a]Optically rotating by third liquid crystal cell

2. Modified Example 1

The optical element 112 described above includes three liquid crystal cells 120 and one optical-rotation liquid crystal cell 121. However, the structure of the optical element 112 is not limited thereto and the optical element 112 may include a plurality of optical-rotation liquid crystal cells 121. For example, the first liquid crystal cell 120-1 and the cell 120-3, and the fourth liquid crystal cell 120-4 and is further optically rotated twice by the first liquid crystal cell 120-1 and the second liquid crystal cell 120-2, providing a polarization component in the y-direction diffused three times in the y-direction. On the other hand, the polarization component in the x-direction is diffused in the x-direction by the second liquid crystal cell 120-2, the third liquid crystal cell 120-3, and the fourth liquid crystal cell 120-4 and is optically rotated twice by the first liquid crystal cell 120-1 and the second liquid crystal cell 120-2, providing a polarization component in the x-direction diffused three times in the x-direction. As a result, the incident light providing a circular irradiation area can be changed into the light providing a cross-shaped irradiation area. In addition, the light coloration can be effectively suppressed because both polarization components are diffused numerous times (at least three times).

may be employed as shown in Table 11, for example. That is, the second electrodes 132 of the first liquid crystal cell 120-1, the first electrodes 130 of the second liquid crystal cell 120-2, and the first electrodes 130 and the second electrodes 132 of the third liquid crystal cell 120-3 and the fourth liquid crystal cell 120-4 may be driven. In this case, the polarization component of the incident light in the y-direction is diffused in the y-direction by the first liquid crystal cell 120-1 to the fourth liquid crystal cell 120-4 and

TABLE 10

Behavior of light incident on optical element 112 (5)

|  |  | Electrode | | Orientation direction of | Incident light | |
| --- | --- | --- | --- | --- | --- | --- |
| Liquid crystal cell | Electrode | Extending direction | Driving or non-driving | orientation film | y Polarization component | x Polarization component |
| First liquid crystal cell | Second electrode | x direction | yes | y direction | Diffusion in y direction[a] | —[a] |
| (Optical-rotation liquid crystal cell) | First electrode | y direction | non | x direction | —[a] | —[a] |
| Second liquid crystal cell (Optical-rotation liquid crystal cell) | Second electrode | x direction | non | y direction | —[b] | —[b] |
|  | First electrode | y direction | yes | x direction | —[b] | Diffusion in x direction[b] |
| Third liquid crystal cell | Second electrode | y direction | yes | y direction | — | Diffusion in x direction |
|  | First electrode | x direction | yes | x direction | Diffusion in y direction | — |
| Fourth liquid crystal cell | Second electrode | y direction | yes | y direction | — | Diffusion in x direction |
|  | First electrode | x direction | yes | x direction | Diffusion in y direction | — |

[a]Optically rotating by 90° by first liquid crystal cell
[b]Optically rotating by 90° by second liquid crystal cell

3. Modified Example 2

Figure 16:
FIG. 16 is a schematic cross-sectional view of an optical element according to an embodiment of the present invention.

In the case of using the optical-rotation liquid crystal cell 121 as the first liquid crystal cell 120-1 and the second liquid crystal cell 120-2 as demonstrated in the Modified Example 1, the first liquid crystal cell 120-1 to the fourth liquid crystal cell 12-4 may be arranged so that the extending direction of the first electrodes 130 of the first liquid crystal cell 120-1 is at an angle equal to or greater than 0° and equal to or less than 10° with respect to the extending direction of the first electrodes 130 of the third liquid crystal cell 120-3 and is at an angle equal to or greater than 80° and equal to or less than 90° with respect to the extending directions of the first electrodes 130 of the second liquid crystal cell 120-2 and fourth liquid crystal cell 120-4 as shown in FIG. 16.

The driving method of the optical element 112 according to this Modified Example 2 is also arbitrarily determined, and the same driving method as the Modified Example 1 is further optically rotated twice by the first liquid crystal cell 120-1 and the second liquid crystal cell 120, providing a polarization component in the y-direction diffused four times in the y-direction. On the other hand, the polarization component in the x-direction is diffused in the x-direction by the third liquid crystal cell 120-3 and the fourth liquid crystal cell 120-4 and is optically rotated twice by the first liquid crystal cell 120-1 and the second liquid crystal cell 120-2, providing a polarization component in the x-direction diffused twice in the x-direction. As a result, the incident light providing a circular irradiation area can be changed to the light providing a cross-shaped irradiation area. In addition, the light coloration can also be effectively suppressed because at least one of the polarization components is diffused numerous times (at least three times).

TABLE 11

Behavior of light incident on optical element 112 (6)

|  |  | Electrode | | Orientation direction of | Incident light | |
| --- | --- | --- | --- | --- | --- | --- |
| Liquid crystal cell | Electrode | Extending direction | Driving or non-driving | orientation film | y Polarization component | x Polarization component |
| First liquid crystal cell | Second electrode | x direction | yes | y direction | Diffusion in y direction[a] | —[a] |
| (Optical-rotation liquid crystal cell) | First electrode | y direction | non | x direction | —[a] | —[a] |

TABLE 11-continued

| | | Behavior of light incident on optical element 112 (6) | | | | |
|---|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| Second liquid crystal cell (Optical-rotation liquid crystal cell) | Second electrode | y direction | non | x direction | —[b] | —[b] |
| | First electrode | x direction | yes | y direction | Diffusion in y direction[b] | —[b] |
| Third liquid crystal cell | Second electrode | x direction | yes | x direction | Diffusion in y direction | — |
| | First electrode | y direction | yes | y direction | — | Diffusion in x direction |
| Fourth liquid crystal cell | Second electrode | y direction | yes | y direction | — | Diffusion in x direction |
| | First electrode | x direction | yes | x direction | Diffusion in y direction | — |

[a]Optically rotating by 90° by first liquid crystal cell
[b]Optically rotating by 90° by second liquid crystal cell

4. Modified Example 3

Figure 17:
FIG. 17 is a schematic cross-sectional view of an optical element according to an embodiment of the present invention.

In the case of using two optical-rotation liquid crystal cells 121 as in the Modified Examples 1 and 2, the optical-rotation liquid crystal cells 121 may be used as the first liquid crystal cell 120-1 and the third liquid crystal cell 120-3 as shown in FIG. 17. In this case, the first liquid crystal cell 120-1 to the fourth liquid crystal cell 120-4 may be arranged so that the extending direction of the first electrodes 130 of the first liquid crystal cell 120-1 is at an angle equal to or greater than 0° and equal to or less than 10° with respect to the extending direction of the first electrodes 130 of the second liquid crystal cell 120-2 and is at an angle equal to or greater than 80° and equal to or less than 90° with respect to the extending directions of the first electrodes 130 of the third liquid crystal cell 120-3 and the fourth liquid crystal cell 120-4, for example.

The method of driving the optical element 112 according to this Modified Example 3 is also arbitrarily determined, and the optical element 112 may be driven according to Table 12, for example. That is, the second electrodes 132 of the first liquid crystal cell 120-1 and the third liquid crystal cell 120-3 may be driven, while the other electrodes may not be driven. In this case, the polarization component of the incident light in the y-direction is diffused in the y-direction by the first liquid crystal cell 120-1 and is further optically rotated four times by the first liquid crystal cell 120-1 to the fourth liquid crystal cell 120-4, providing a polarization component in the y-direction diffused once in the y-direction. On the other hand, the polarization component in the x-direction is diffused in the x-direction by the third liquid crystal cell 120-3 and is optically rotated four times by the first liquid crystal cell 120-1 to the fourth liquid crystal cell 120-4, providing a polarization component in the x-direction diffused once in the x-direction. As a result, the incident light providing a circular irradiation area can be changed to the light providing a cross-shaped irradiation area.

TABLE 12

| | | Behavior of light incident on optical element 112 (7) | | | | |
|---|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| First liquid crystal cell (Optical-rotation liquid crystal cell) | Second electrode | x direction | yes | y direction | Diffusion in y direction[a] | —[a] |
| | First electrode | y direction | non | x direction | —[a] | —[a] |
| Second liquid crystal cell | Second electrode | x direction | non | x direction | —[b] | —[b] |
| | First electrode | y direction | non | y direction | —[b] | —[b] |
| Third liquid crystal cell (Optical-rotation liquid crystal cell) | Second electrode | y direction | yes | x direction | —[c] | Diffusion in x direction[c] |
| | First electrode | x direction | non | y direction | —[c] | —[c] |
| Fourth liquid crystal cell | Second electrode | y direction | non | y direction | —[d] | —[d] |
| | First electrode | x direction | non | x direction | —[d] | —[d] |

[a]Optically rotating by 90° by first liquid crystal cell
[b]Optically rotating by 90° by second liquid crystal cell
[c]Optically rotating by 90° by third liquid crystal cell
[d]Optically rotating by 90° by fourth liquid crystal cell 5. Modified Example 4

Figure 18:
FIG. 18 is a schematic cross-sectional view of an optical element according to an embodiment of the present invention.

In the case of using two optical-rotation liquid crystal cells 121 as in the Modified Examples 1 to 3, the optical-rotation liquid crystal cells 121 may be used as the first liquid crystal cell 120-1 and the fourth liquid crystal cell 120-4 as shown in FIG. 18. In this case, the first liquid crystal cell 120-1 to the fourth liquid crystal cell 120-4 may be arranged so that the extending direction of the first electrodes 130 of the first liquid crystal cell 120-1 is at an angle equal to or greater than 0° and equal to or less than 10° with respect to the extending direction of the first electrodes 130 of the second liquid crystal cell 120-2 and is at an angle equal to or greater than 80° and equal to or less than 90° with respect to the extending directions of the first electrodes 130 of the third liquid crystal cell 120-3 and the fourth liquid crystal cell 120-4, for example.

The method of driving the optical element 112 according to the Modified Example 4 is also arbitrarily determined and the optical element 112 may be driven according to Table 13, for example. That is, the first electrodes 130 of the third liquid crystal cell 120-3 and the second electrodes 132 of the first liquid crystal cell 120-1, the third liquid crystal cell 120-3, and the fourth liquid crystal cell 120-4 may be driven, while the other electrodes may not be driven. In this case, the polarization component of the incident light in the y-direction is diffused in the y-direction by the first liquid crystal cell 120-1 and the third liquid crystal cell 120-3 and is optically rotated three times by the first liquid crystal cell 120-1, the second liquid crystal cell 120 2, and the fourth liquid crystal cell 120-4, providing a polarization component in the x-direction diffused twice in the y-direction. On the other hand, the polarization component in the x-direction is diffused in the x-direction by the third liquid crystal cell 120-3 and the fourth liquid crystal cell 120-4 and is optically rotated three times by the first liquid crystal cell 120-1, the second liquid crystal cell 120-2, and the fourth liquid crystal cell 120-4, providing a polarization component in the y-direction diffused twice in the x-direction. As a result, the incident light providing a circular irradiation area can be changed to the light providing a cross-shaped irradiation area.

6. Modified Example 5

Figure 19:
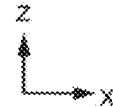
FIG. 19 is a schematic cross-sectional view of an optical element according to an embodiment of the present invention.

In the case where the optical-rotation liquid crystal cells 121 are used as the first liquid crystal cell 120-1 and the fourth liquid crystal cell 120-4 as in the Modified Example 4, the first liquid crystal cell 120-1 to the fourth liquid crystal cell 120-4 may be arranged so that the extending direction of the first electrodes 130 of the first liquid crystal cell 120-1 is at an angle equal to or greater than 0° and equal to or less than 10° with respect to the extending direction of the first electrodes 130 of the second liquid crystal cell 120-1, the third liquid crystal cell 120-3, and the fourth liquid crystal cell 120-4 as shown in FIG. 19.

The driving method of the optical element 112 according to this Modified Example 5 is also arbitrarily determined, and the same driving method as the Modified Example 4 may be employed as shown in Table 14, for example. That is, the first electrodes 130 of the third liquid crystal cell 120-3 and the second electrodes 132 of the first liquid crystal cell 120-1, the third liquid crystal cell 120-3, and the fourth liquid crystal cell 120-4 may be driven, while the other electrodes may not be driven. In this case, the polarization component of the incident light in the y-direction is diffused in the y-direction by the first liquid crystal cell 120-1, the third liquid crystal cell 120-3, and the fourth liquid crystal cell 120-4 and is optically rotated three times by the first liquid crystal cell 120-1, the second liquid crystal cell 120-2, and the fourth liquid crystal cell 120-4, providing a polarization component in the x-direction diffused in the y-direction three times. On the other hand, the polarization component in the x-direction is diffused in the x-direction by the third liquid crystal cell 120-3 and is optically rotated three times by the first liquid crystal cell 120-1, the second liquid crystal cell 120-2, and the fourth liquid crystal cell 120-4, providing a polarization component in the y-direction diffused once in the x-direction. As a result, the incident light providing a circular irradiation area can be changed to the light providing a cross-shaped irradiation area. The light coloration can also be effectively suppressed because at least one polarization component is diffused numerous times (at least three times).

TABLE 13

| Behavior of light incident on optical element 112 (8) | | | | | |
|---|---|---|---|---|---|
| | | Electrode | | Orientation direction of | Incident light | |
| Liquid crystal cell | Electrode | Extending direction | Driving or non-driving | orientation film | y Polarization component | x Polarization component |
| First liquid crystal cell | Second electrode | x direction | yes | y direction | Diffusion in y direction | —[a] |
| (Optical-rotation liquid crystal cell) | First electrode | y direction | non | x direction | —[a] | —[a] |
| Second liquid crystal cell | Second electrode | x direction | non | x direction | —[b] | —[b] |
| | First electrode | y direction | non | y direction | —[b] | —[b] |
| Third liquid crystal cell | Second electrode | y direction | yes | y direction | — | Diffusion in x direction |
| | First electrode | x direction | yes | x direction | Diffusion in y direction | — |
| Fourth liquid crystal cell | Second electrode | y direction | yes | x direction | —[c] | Diffusion in x direction[c] |
| (Optical-rotation liquid crystal cell) | First electrode | x direction | non | y direction | —[c] | —[c] |

[a]Optically rotating by 90° by first liquid crystal cell
[b]Optically rotating by 90° by second liquid crystal cell
[c]Optically rotating by 90° by fourth liquid crystal cell

TABLE 14

| Behavior of light incident on optical element 112 (9) | | | | | | |
|---|---|---|---|---|---|---|
| | Electrode | | | Orientation direction of | Incident light | |
| Liquid crystal cell | Electrode | Extending direction | Driving or non-driving | orientation film | y Polarization component | x Polarization component |
| First liquid crystal cell | Second electrode | x direction | yes | y direction | Diffusion in y direction | —[a] |
| (Optical rotation liquid crystal | First electrode | y direction | non | x direction | —[a] | —[a] |
| Second liquid crystal cell | Second electrode | x direction | non | x direction | —[b] | —[b] |
| | First electrode | y direction | non | y direction | —[b] | —[b] |
| Third liquid crystal cell | Second electrode | x direction | yes | x direction | Diffusion in y direction | — |
| | First electrode | y direction | yes | y direction | — | Diffusion in x direction |
| Fourth liquid crystal cell | Second electrode | x direction | yes | y direction | Diffusion in y direction[c] | —[c] |
| (Optical rotation liquid crystal | First electrode | y direction | non | x direction | —[c] | —[c] |

[a]Optically rotating by 90° by first liquid crystal cell
[b]Optically rotating by 90° by second liquid crystal cell
[c]Optically rotating by 90° by fourth liquid crystal cell As described above, the use of the optical elements 110 and 112 enables the light from the light source 102 to be changed into the light providing irradiation areas having arbitrary shapes. In addition, coloration to the light with varied light distribution can be suppressed by appropriately selecting the structure and arrangement of the plurality of liquid crystal cells 120 in the optical elements 110 and 112. Therefore, the lighting device 100 including the optical element 110 or 112 according to the embodiment of the present invention is able to function as a lighting device capable of providing a variety of irradiation areas.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. An optical element comprising a first liquid crystal cell, a second liquid crystal cell, a third liquid crystal cell, and a fourth liquid crystal cell arranged in this order to overlap one another, each of the first liquid crystal cell, the second liquid crystal cell, the third liquid crystal cell, and the fourth liquid crystal cell comprising:
   a plurality of first electrodes arranged in a stripe form and extending in a first extending direction;
   a first orientation film over the plurality of first electrodes;
   a liquid crystal layer over the first orientation film;
   a second orientation film over the liquid crystal layer; and
   a plurality of second electrodes located over the second orientation film, arranged in a stripe form, and extending in a second extending direction intersecting the first extending direction, wherein, in each of the first liquid crystal cell, the second liquid crystal cell, the third liquid crystal cell, and the fourth liquid crystal cell,
   the first orientation film and the second orientation film are configured to respectively orient liquid crystal molecules included in the liquid crystal layer in a first orientation direction and a second orientation direction intersecting each other when no voltage is applied to the plurality of first electrodes and the plurality of second electrodes,
   an angle between the first extending direction and the first orientation direction is equal to or less than 10°, and
   an angle between the second extending direction and the second orientation direction is equal to or less than 10°, and
the first extending direction of the first liquid crystal cell is at an angle equal to or greater than 0° and equal to or less than 10° with respect to the first extending direction of the second liquid crystal cell and is at an angle equal to or greater than 80° and equal to or less than 90° with respect to the first extending directions of the third liquid crystal cell and the fourth liquid crystal cell.

2. The optical element according to claim 1,
wherein, in each of the first liquid crystal cell, the second liquid crystal cell, the third liquid crystal cell, and the fourth liquid crystal cell,
   the plurality of first electrodes is configured to be applied with a first AC voltage so as to be opposite in phase between adjacent first electrodes, and
   the plurality of second electrodes is configured to be applied with a second AC voltage so as to be opposite in phase between adjacent second electrodes.

3. The optical element according to claim 1,
wherein, in at least one of the first liquid crystal cell, the second liquid crystal cell, the third liquid crystal cell, and the fourth liquid crystal cell, each of the plurality of first electrodes and the plurality of second electrodes is bent so as to have a plurality of linear portions.

4. The optical element according to claim 3, wherein, in each of the plurality of first electrodes, an extending direction of at least one of the plurality of linear portions is inclined from the first orientation direction, and wherein, in each of the plurality of second electrodes, an extending direction of at least one of the plurality of linear portions is inclined from the second orientation direction.

5. The optical element according to claim 1, wherein, in at least one of the first liquid crystal cell, the second liquid crystal cell, the third liquid crystal cell, and the fourth liquid crystal cell, a tip of at least one of the plurality of first electrodes has an acute angle, and a tip of at least one of the plurality of second electrodes has an acute angle.

6. A lighting device comprising:

the optical element according to claim 1; and a light source located over the optical element and arranged on a side of the first liquid crystal cell.

7. An optical element comprising a first liquid crystal cell, a second liquid crystal cell, a third liquid crystal cell, and a fourth liquid crystal cell arranged in this order to overlap one another, each of the first liquid crystal cell, the second liquid crystal cell, the third liquid crystal cell, and the fourth liquid crystal cell comprising:

a plurality of first electrodes arranged in a stripe form and extending in a first extending direction;

a first orientation film over the plurality of first electrodes;

a liquid crystal layer over the first orientation film;

a second orientation film over the liquid crystal layer; and a plurality of second electrodes located over the second orientation film, arranged in a stripe form, and extending in a second extending direction intersecting the first extending direction, wherein, in each of the first liquid crystal cell, the second liquid crystal cell, the third liquid crystal cell, and the fourth liquid crystal cell, the first orientation film and the second orientation film are configured to respectively orient liquid crystal molecules included in the liquid crystal layer in a first orientation direction and a second orientation direction when no voltage is applied to the plurality of first electrodes and the plurality of second electrodes, wherein, in at least one of the first liquid crystal cell, the second liquid crystal cell, the third liquid crystal cell, and the fourth liquid crystal cell, an angle between the first extending direction and the first orientation direction is equal to or less than 10°, and an angle between the second extending direction and the second orientation direction is equal to or less than 10°, and wherein, in at least one of the other liquid crystal cells, an angle between the first extending direction and the first orientation direction is equal to or greater than 80° and equal to or less than 90°, and an angle between the second extending direction and the second orientation direction is equal to or greater than 80° and equal to or less than 90°.

8. The optical element according to claim 7, wherein the at least one liquid crystal cell includes the first liquid crystal cell, the second liquid crystal cell, and the third liquid crystal cell, and the first extending direction of the first liquid crystal cell is at an angle equal to or greater than 0° and equal to or less than 10° with respect to the first extending direction of the second liquid crystal cell and is at an angle equal to or greater than 80° and equal to or less than 90° with respect to the first extending directions of the third liquid crystal cell and the fourth liquid crystal cell.

9. The optical element according to claim 7, wherein the at least one liquid crystal cell includes the third liquid crystal cell and the fourth liquid crystal cell, and the first extending direction of the first liquid crystal cell is at an angle equal to or greater than 0° and equal to or less than 10° with respect to the first extending direction of the second liquid crystal cell and is at an angle equal to or greater than 80° and equal to or less than 90° with respect to the first extending directions of the third liquid crystal cell and the fourth liquid crystal cell.

10. The optical element according to claim 7, wherein the at least one liquid crystal cell includes the third liquid crystal cell and the fourth liquid crystal cell, and the first extending direction of the first liquid crystal cell is at an angle equal to or greater than 0° and equal to or less than 10° with respect to the first extending direction of the third liquid crystal cell and is at an angle equal to or greater than 80° and equal to or less than 90° with respect to the first extending directions of the second liquid crystal cell and the fourth liquid crystal cell.

11. The optical element according to claim 7, wherein the at least one liquid crystal cell includes the second liquid crystal cell and the fourth liquid crystal cell, and the first extending direction of the first liquid crystal cell is at an angle equal to or greater than 0° and equal to or less than 10° with respect to the first extending direction of the second liquid crystal cell and is at an angle equal to or greater than 80° and equal to or less than 90° with respect to the first extending directions of the third liquid crystal cell and the fourth liquid crystal cell.

12. The optical element according to claim 7, wherein the at least one liquid crystal cell includes the second liquid crystal cell and the third liquid crystal cell, and the first extending direction of the first liquid crystal cell is at an angle equal to or greater than 0° and equal to or less than 10° with respect to the first extending direction of the second liquid crystal cell and is at an angle equal to or greater than 80° and equal to or less than 90° with respect to the first extending directions of the third liquid crystal cell and the fourth liquid crystal cell.

13. The optical element according to claim 7, wherein the at least one liquid crystal cell includes the second liquid crystal cell and the third liquid crystal cell, and the first extending direction of the first liquid crystal cell is at an angle equal to or greater than 0° and equal to or less than 10° with respect to the first extending directions of the second liquid crystal cell, the third liquid crystal cell, and the fourth liquid crystal cell.

14. The optical element according to claim 7, wherein, in each of the first liquid crystal cell, the second liquid crystal cell, the third liquid crystal cell, and the fourth liquid crystal cell, the plurality of first electrodes is configured to be applied with a first AC voltage so as to be opposite in phase between adjacent first electrodes, and the plurality of second electrodes is configured to be applied with a second AC voltage so as to be opposite in phase between adjacent second electrodes.

15. The optical element according to claim 7, wherein, in at least one of the first liquid crystal cell, the second liquid crystal cell, the third liquid crystal cell, and the fourth liquid crystal cell, each of the plurality of first electrodes and the plurality of second electrodes is bent so as to have a plurality of linear portions.

16. The optical element according to claim 15, wherein, in each of the plurality of first electrodes, an extending direction of at least one of the plurality of linear portions is inclined from the first orientation direction, and wherein, in each of the plurality of second electrodes, an extending direction of at least one of the plurality of linear portions is inclined from the second orientation direction.

17. The optical element according to claim 7, wherein, in at least one of the first liquid crystal cell, the second liquid crystal cell, the third liquid crystal cell, and the fourth liquid crystal cell, a tip of at least one of the plurality of first electrodes has an acute angle, and a tip of at least one of the plurality of second electrodes has an acute angle.

18. A lighting device comprising:

the optical element according to claim 7; and a light source located over the optical element and arranged on a side of the first liquid crystal cell.

* * * * *